United States Patent
Chen et al.

(10) Patent No.: US 12,376,127 B2
(45) Date of Patent: Jul. 29, 2025

(54) CARRIER AGGREGATION UNDER DIFFERENT SUBFRAME STRUCTURES IN NEW RADIO

(71) Applicant: QUALCOMM Incorporated, San Diego, CA (US)

(72) Inventors: Wanshi Chen, San Diego, CA (US); Heechoon Lee, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/513,441

(22) Filed: Nov. 17, 2023

(65) Prior Publication Data

US 2024/0163893 A1    May 16, 2024

Related U.S. Application Data

(63) Continuation of application No. 16/723,343, filed on Dec. 20, 2019, now Pat. No. 11,832,092, which is a
(Continued)

(51) Int. Cl.
*H04W 72/23* (2023.01)
*H04L 5/00* (2006.01)
(Continued)

(52) U.S. Cl.
CPC .............. *H04W 72/23* (2023.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| 8,634,313 B2 | 1/2014 | Tenny et al. |
| 8,965,442 B2 | 2/2015 | Chen et al. |
| (Continued) | | |

FOREIGN PATENT DOCUMENTS

| CN | 102870366 A | 1/2013 |
| CN | 103684683 A | 3/2014 |
| (Continued) | | |

OTHER PUBLICATIONS

ETSI: "LTE, Evolved Universal Terrestrial Radio Access (E-UTRA), Physical channels and modulation (3GPP TS 36.211 version 13.6.0 Release 13)", ETSI TS 136 211 V13.6.0, Aug. 2017, pp. 1-172.
(Continued)

*Primary Examiner* — Hong S Cho
(74) *Attorney, Agent, or Firm* — Arun Swain

(57) ABSTRACT

A method and apparatus for downlink and uplink control management of component carriers during carrier aggregation in a new radio wireless communication system is disclosed. For example, the method and apparatus include receiving, at a user equipment (UE), a slot format indicator in at least one slot of at least one component carrier of a plurality of component carriers from a network entity, where the at least one component carrier includes a group common Physical Downlink Control Channel (PDCCH), the slot format indicator within the group common PDCCH indicating at least slot structure information for one or more other component carriers from the plurality of component carriers; and communicating, with the network entity, using the at least slot structure information for the one more other component carriers.

20 Claims, 17 Drawing Sheets

Related U.S. Application Data continuation of application No. 16/003,753, filed on Jun. 8, 2018, now Pat. No. 10,548,126.

(60) Provisional application No. 62/521,172, filed on Jun. 16, 2017.

(51) Int. Cl.
  *H04W 24/08* (2009.01)
  *H04W 24/10* (2009.01)
  *H04W 72/0446* (2023.01)
  *H04W 72/21* (2023.01)

(52) U.S. Cl.
  CPC ........... *H04W 24/08* (2013.01); *H04W 24/10* (2013.01); *H04W 72/0446* (2013.01); *H04W 72/21* (2023.01)

(56) References Cited

U.S. PATENT DOCUMENTS

| | | | |
|---|---|---|---|
| 9,019,850 B2 | 4/2015 | Chen et al. | |
| 9,467,885 B2 | 10/2016 | Tenny et al. | |
| 9,980,169 B2 | 5/2018 | Gheorghiu et al. | |
| 10,085,164 B2 | 9/2018 | Chen et al. | |
| 10,548,126 B2 | 1/2020 | Chen et al. | |
| 2012/0063321 A1 | 3/2012 | Chandrasekhar et al. | |
| 2012/0207047 A1 | 8/2012 | Liao et al. | |
| 2013/0279363 A1* | 10/2013 | Huang | H04W 24/10 370/252 |
| 2014/0241222 A1* | 8/2014 | Yang | H04L 5/005 370/280 |
| 2015/0103715 A1 | 4/2015 | Chen et al. | |
| 2015/0230268 A1* | 8/2015 | Chen | H04W 56/0005 370/280 |
| 2016/0135143 A1* | 5/2016 | Won | H04W 52/243 370/312 |
| 2016/0254878 A1* | 9/2016 | Wang | H04L 5/0053 370/329 |
| 2018/0263021 A1* | 9/2018 | He | H04W 72/21 |
| 2018/0368114 A1 | 12/2018 | Chen et al. | |
| 2019/0165904 A1* | 5/2019 | Jo | H04L 5/0053 |
| 2020/0128520 A1 | 4/2020 | Chen et al. | |
| 2020/0136882 A1 | 4/2020 | Jo et al. | |
| 2020/0404628 A1* | 12/2020 | Jo | H04L 5/1469 |

FOREIGN PATENT DOCUMENTS

| | | |
|---|---|---|
| CN | 106416117 A | 2/2017 |
| EP | 3316621 A1 | 5/2018 |
| JP | 2017017371 A | 1/2017 |
| WO | 2010148404 | 12/2010 |
| WO | 2011140504 | 11/2011 |
| WO | 2012064780 A1 | 5/2012 |
| WO | 2012142128 A2 | 10/2012 |
| WO | 2012149028 A1 | 11/2012 |
| WO | 2014070761 | 5/2014 |
| WO | 2015057368 | 4/2015 |
| WO | 2015119846 A1 | 8/2015 |
| WO | 2016122845 A1 | 8/2016 |
| WO | 2016187066 A1 | 11/2016 |
| WO | 2016208726 A1 | 12/2016 |
| WO | 2017018758 A1 | 2/2017 |

OTHER PUBLICATIONS

ETSI: "LTE, Evolved Universal Terrestrial Radio Access (E-UTRA), Physical layer procedures (3GPP TS 36.213 version 13.6.0 Release 13)", ETSI TS 136 213 V13.6.0, Aug. 2017, pp. 1-391.

"3rd Generation Partnership Project, Technical Specification Group Radio Access Network, Evolved Universal Terrestrial Radio Access (E-UTRA), Multiplexing and channel coding (Release 13)", 3GPP TS 36.212 V13.5.0 (Mar. 2017), 140 Pages.

CATT: "Group-Common PDCCH Structure and Configuration", 3GPP TSG RAN WG1 Meeting #89, R1-1707500, Hangzhou, P. R. China, May 15-19, 2017, 5 Pages.

CMCC: "Discussion on DCI Contents for NR", 3GPP TSG RAN WG1 Meeting #89, R1-1708399, Hangzhou, China, May 15, 2017-May 19, 2017, 9 Pages, May 6, 2017.

European Search Report—EP21202721—Search Authority—The Hague—Feb. 16, 2022.

Intel Corporation: "Bundled HARQ-ACK Feedback in NR", 3GPP TSG RAN WG1 Meeting RAN1 #88bis, R1-1705033, Spokane, WA, U.S.A, Apr. 3, 2017-Apr. 7, 2017, 4 Pages, Mar. 25, 2017.

Intel Corporation: "Group-Common PDCCH: Contents", R1-1712573, 3GPP TSG RAN WG1 Meeting #90, Prague, Czechia, Aug. 21-25, 2017, 6 Pages.

International Preliminary Report on Patentability—PCT/US2018/036830, The International Bureau of WIPO—Geneva, Switzerland, Dec. 26, 2018.

International Search Report and Written Opinion—PCT/US2018/036830—ISA/EPO—Sep. 21, 2018.

LG Electronics: "Discussion on the Contents and the Signaling of Group Common PDCCH", R1-1707634, 3GPP TSG RAN WG1 Meeting #89, Hangzhou, China May 15-19, 2017, 5 Pages, May 6, 2017.

LG Electronics: "Discussion on the Contents of Group Common PDCCH", R1-1710310, 3GPP TSG RAN WG1 NR Ad Hoc #2, Qingdao, China Jun. 27-30, 2017, 6 Pages.

Mediatek Inc: "Group Common PDCCH Design," 3GPP TSG RAN WG1 Meeting #88bis, R1-1704443, Spokane, USA, Apr. 3-7, 2017, (Apr. 7, 2017), 6 pages.

Nokia, et al., "On Common PDCCH for NR," 3GPP TSG-RAN WG1 Meeting #88, R1-1703311, Athens, Greece, Feb. 13-17, 2017, (Feb. 17, 2017), 5 pages.

Taiwan Search Report—TW107119996—TIPO—Jun. 22, 2021.

\* cited by examiner

200
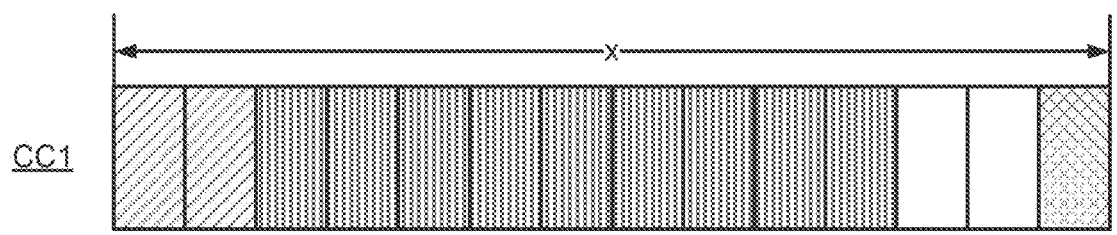
CC1
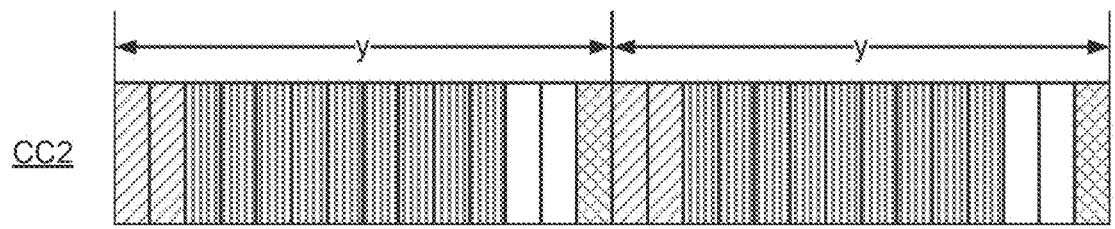
CC2
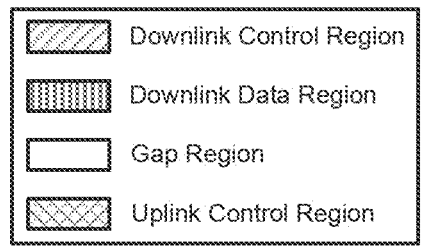
*FIG. 2*

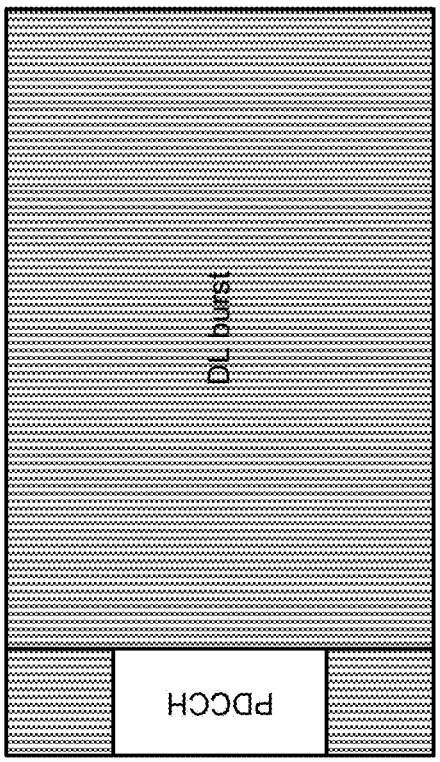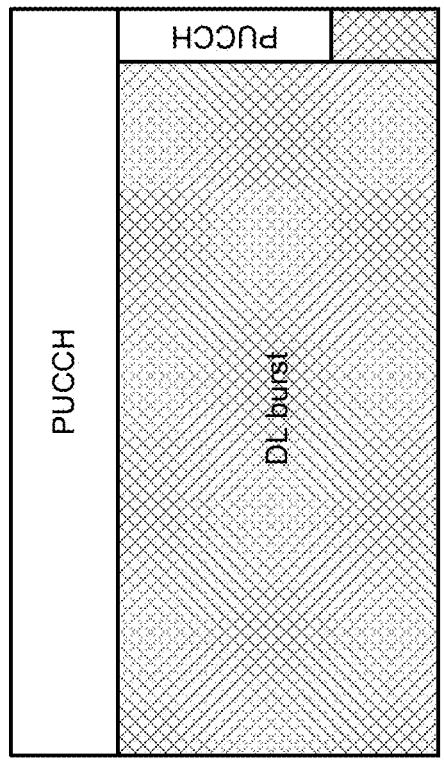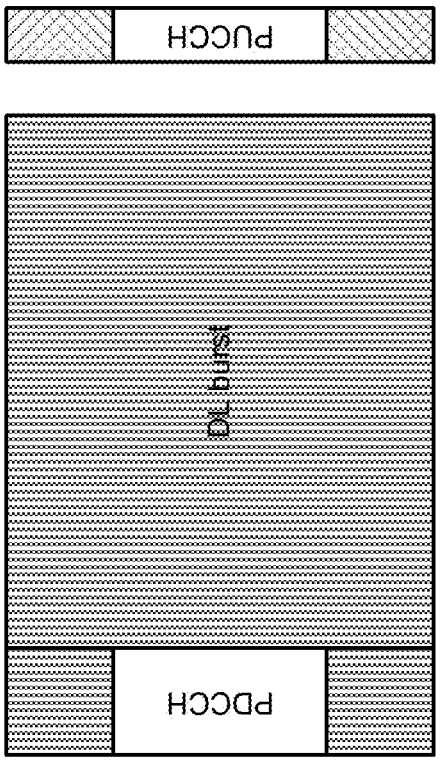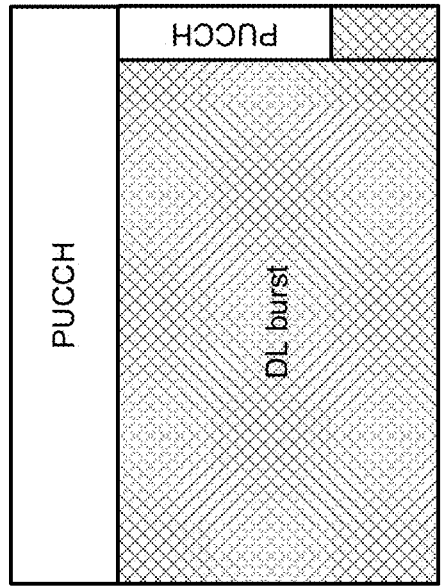
FIG. 3

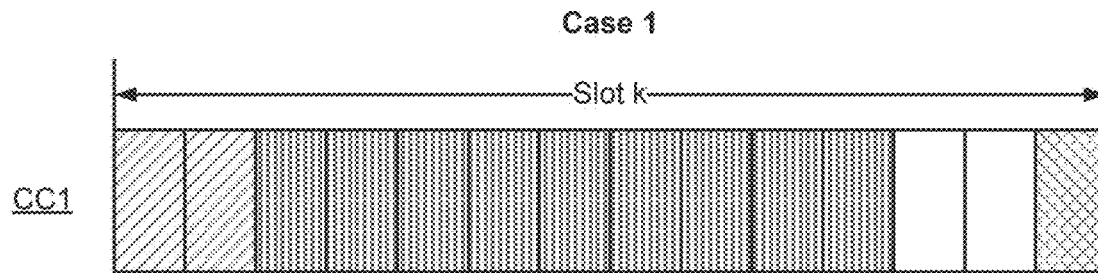
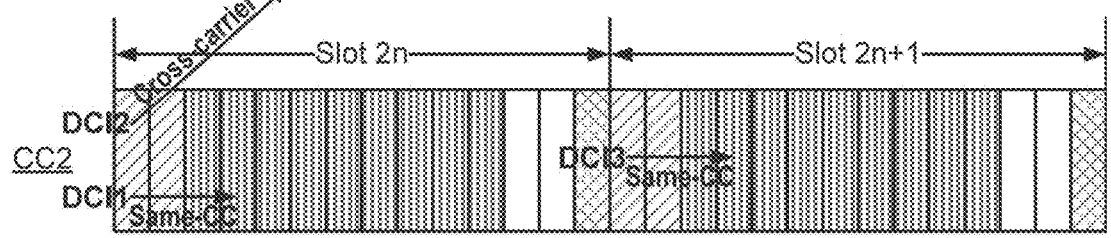
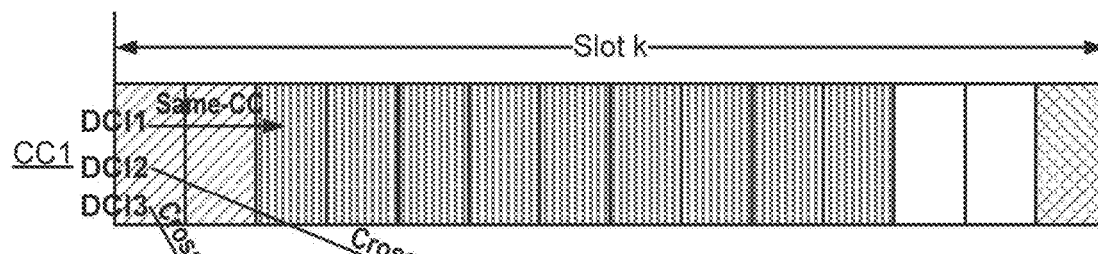
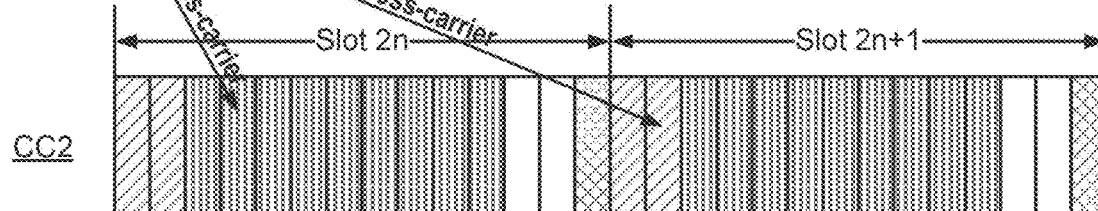
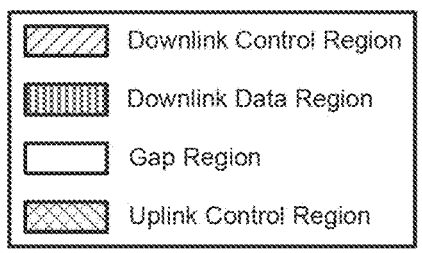
FIG. 6

1300

1302

Assign, at a network entity, a component carrier to a timing advance group based on one or more carrier characteristics of the component carrier, the timing advance group including one or more component carriers and a timing advance associated with each of the one or more component carriers

1304

Transmit, to a user equipment (UE), the timing advance offset associated with the component carrier

Receive, at a user equipment (UE), a slot format indicator in at least one slot of at least one component carrier of a plurality of component carriers from a network entity, where the at least one component carrier includes a group common Physical Downlink Control Channel (PDCCH), the slot format indicator within the group common PDCCH indicating at least slot structure information for one or more other component carriers from the plurality of component carriers

1404

Communicate, with the network entity, using the at least slot structure information for the one more other component carriers

Generate, at a network entity, a slot format indicator for at least one component carrier of a plurality of component carriers, where the at least one component carrier includes a group common Physical Downlink Control Channel (PDCCH), the slot format indicator within the group common PDCCH indicating at least slot structure information for one or more other component carriers from the plurality of component carriers

1504

Transmit, by the network entity, the slot format indicator in at least one slot of the at least one component carrier to a user equipment (UE)

1506

Communicate, with the UE, using the at least slot structure information for the one more other component carriers

*FIG. 15*

CARRIER AGGREGATION UNDER DIFFERENT SUBFRAME STRUCTURES IN NEW RADIO

CROSS-REFERENCE TO RELATED APPLICATION(S)

The present application is a continuation of U.S. patent application Ser. No. 16/723,343, entitled "CARRIER AGGREGATION UNDER DIFFERENT SUBFRAME STRUCTURES IN NEW RADIO" filed on Dec. 20, 2019, which is a continuation of U.S. patent application Ser. No. 16/003,753, entitled "CARRIER AGGREGATION UNDER DIFFERENT SUBFRAME STRUCTURES IN NEW RADIO" filed on Jun. 8, 2018, and claims benefit of U.S. Provisional Application No. 62/521,172 entitled "CARRIER AGGREGATION UNDER DIFFERENT SUBFRAME STRUCTURES IN NEW RADIO" filed Jun. 16, 2017, and both are assigned to the assignee hereof and hereby expressly incorporated by reference herein.

BACKGROUND

Aspects of the present disclosure relate generally to wireless communication networks, and more particularly, to downlink and uplink control management of component carriers during carrier aggregation in a new radio wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, improvements in downlink and uplink control management of component carriers during carrier aggregation may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of downlink and uplink control management of component carriers during carrier aggregation for wireless communications. The described aspects include generating, at a network entity, a slot format indicator for at least one component carrier, each component carrier including a group common Physical Downlink Control Channel (PDCCH), the slot format indicator indicating at least slot structure information for one or more other component carriers within the group common PDCCH. The described aspects further include transmitting, to a user equipment (UE), the slot format indicator in at least one slot of the at least one component carrier.

In an aspect, an apparatus for downlink and uplink control management of component carriers during carrier aggregation for wireless communications may include a transceiver, a memory; and at least one processor coupled with the memory and configured to generate, at a network entity, a slot format indicator for at least one component carrier, each component carrier including a group common PDCCH, the slot format indicator indicating at least slot structure information for one or more other component carriers within the group common PDCCH. The described aspects further transmit, to a UE, the slot format indicator in at least one slot of the at least one component carrier.

In an aspect, a computer-readable medium may store computer executable code for downlink and uplink control management of component carriers during carrier aggregation for wireless communications is described. The described aspects include code for generating, at a network entity, a slot format indicator for at least one component carrier, each component carrier including a group common PDCCH, the slot format indicator indicating at least slot structure information for one or more other component carriers within the group common PDCCH. The described aspects further include code for transmitting, to a UE, the slot format indicator in at least one slot of the at least one component carrier.

In an aspect, an apparatus for downlink and uplink control management of component carriers during carrier aggregation for wireless communications is described. The described aspects include means for generating, at a network entity, a slot format indicator for at least one component carrier, each component carrier including a group common PDCCH, the slot format indicator indicating at least slot structure information for one or more other component carriers within the group common PDCCH. The described aspects further include means for transmitting, to a UE, the slot format indicator in at least one slot of the at least one component carrier.

In accordance with another aspect, a method of downlink and uplink control management of component carriers during carrier aggregation for wireless communications. The described aspects include determining, at a network entity, whether cross-carrier scheduling for two or more component carriers with different numerologies is enabled. The described aspects further include generating at least one Downlink Control Information (DCI) for at least one of the two or more component carriers based on a determination that cross-carrier scheduling is enabled, the DCI indicating at least slot structure information for one or more other component carriers of the two or more component carriers. The described aspects further include transmitting, to a UE, the at least one DCI in at least one slot of the at least one of the two or more component carriers.

In an aspect, an apparatus for downlink and uplink control management of component carriers during carrier aggregation for wireless communications may include a transceiver, a memory; and at least one processor coupled with the memory and configured to determine, at a network entity, whether cross-carrier scheduling for two or more component carriers with different numerologies is enabled. The described aspects further generate at least one DCI for at least one of the two or more component carriers based on a determination that cross-carrier scheduling is enabled, the DCI indicating at least slot structure information for one or more other component carriers of the two or more component carriers. The described aspects further transmit, to a UE, the at least one DCI in at least one slot of the at least one of the two or more component carriers.

In an aspect, a computer-readable medium may store computer executable code for downlink and uplink control management of component carriers during carrier aggregation for wireless communications is described. The described aspects include code for determining, at a network entity, whether cross-carrier scheduling for two or more component carriers with different numerologies is enabled. The described aspects further include code for generating at least one DCI for at least one of the two or more component carriers based on a determination that cross-carrier scheduling is enabled, the DCI indicating at least slot structure information for one or more other component carriers of the two or more component carriers. The described aspects further include code for transmitting, to a UE, the at least one DCI in at least one slot of the at least one of the two or more component carriers.

In an aspect, an apparatus for downlink and uplink control management of component carriers during carrier aggregation for wireless communications is described. The described aspects include means for determining, at a network entity, whether cross-carrier scheduling for two or more component carriers with different numerologies is enabled. The described aspects further include means for generating at least one DCI for at least one of the two or more component carriers based on a determination that cross-carrier scheduling is enabled, the DCI indicating at least slot structure information for one or more other component carriers of the two or more component carriers. The described aspects further include means for transmitting, to a UE, the at least one DCI in at least one slot of the at least one of the two or more component carriers.

In accordance with another aspect, a method of downlink and uplink control management of component carriers during carrier aggregation for wireless communications. The described aspects include receiving, at a UE, an indication to trigger Channel State Information (CSI) measurements in at least two or more component carriers, the indication included within DCI received in a slot of one of the at least two or more component carriers. The described aspects further include determining a measurement configuration for performing the CSI measurements in the at least two or more component carriers. The described aspects further include performing the CSI measurements in the at least two or more component carriers based on the measurement configuration. The described aspects further include transmitting, to a network entity, the CSI measurements for the at least two or more component carriers.

In an aspect, an apparatus for downlink and uplink control management of component carriers during carrier aggregation for wireless communications may include a transceiver, a memory; and at least one processor coupled with the memory and configured to receive, at a UE, an indication to trigger CSI measurements in at least two or more component carriers, the indication included within DCI received in a slot of one of the at least two or more component carriers. The described aspects further determine a measurement configuration for performing the CSI measurements in the at least two or more component carriers. The described aspects further perform the CSI measurements in the at least two or more component carriers based on the measurement configuration. The described aspects further transmit, to a network entity, the CSI measurements for the at least two or more component carriers.

In an aspect, a computer-readable medium may store computer executable code for downlink and uplink control management of component carriers during carrier aggregation for wireless communications is described. The described aspects include code for receiving, at a UE, an indication to trigger CSI measurements in at least two or more component carriers, the indication included within DCI received in a slot of one of the at least two or more component carriers. The described aspects further include code for determining a measurement configuration for performing the CSI measurements in the at least two or more component carriers. The described aspects further include code for performing the CSI measurements in the at least two or more component carriers based on the measurement configuration. The described aspects further include code for transmitting, to a network entity, the CSI measurements for the at least two or more component carriers.

In an aspect, an apparatus for downlink and uplink control management of component carriers during carrier aggregation for wireless communications is described. The described aspects include means for receiving, at a UE, an indication to trigger CSI measurements in at least two or more component carriers, the indication included within DCI received in a slot of one of the at least two or more component carriers. The described aspects further include means for determining a measurement configuration for performing the CSI measurements in the at least two or more component carriers. The described aspects further include means for performing the CSI measurements in the at least two or more component carriers based on the measurement configuration. The described aspects further include means for transmitting, to a network entity, the CSI measurements for the at least two or more component carriers.

In accordance with another aspect, a method of downlink and uplink control management of component carriers during carrier aggregation for wireless communications. The described aspects include generating, at a UE, Uplink Control Information (UCI) for at least one component carrier, the UCI including uplink information for at least one or more other component carriers. The described aspects further include transmitting, to a network entity, the UCI in at least one slot of the at least one component carrier.

In an aspect, an apparatus for downlink and uplink control management of component carriers during carrier aggregation for wireless communications may include a transceiver, a memory; and at least one processor coupled with the memory and configured to generate, at a UE, UCI for at least one component carrier, the UCI including uplink information for at least one or more other component carriers. The described aspects further transmit, to a network entity, the UCI in at least one slot of the at least one component carrier.

In an aspect, a computer-readable medium may store computer executable code for downlink and uplink control management of component carriers during carrier aggregation for wireless communications is described. The described aspects include code for generating, at a UE, UCI for at least one component carrier, the UCI including uplink information for at least one or more other component carriers. The described aspects further include code for transmitting, to a network entity, the UCI in at least one slot of the at least one component carrier.

In an aspect, an apparatus for downlink and uplink control management of component carriers during carrier aggregation for wireless communications is described. The described aspects include means for generating, at a UE, Uplink Control Information (UCI) for at least one component carrier, the UCI including uplink information for at least one or more other component carriers. The described aspects further include means for transmitting, to a network entity, the UCI in at least one slot of the at least one component carrier.

In accordance with another aspect, a method of downlink and uplink control management of component carriers during carrier aggregation for wireless communications. The described aspects include assigning, at a network entity, a component carrier to a timing advance group based on one or more carrier characteristics of the component carrier, the timing advance group including one or more component carriers and a timing advance offset associated with each of the one or more component carriers. The described aspects further include transmitting, to a UE, the timing advance offset associated with the component carrier.

In an aspect, an apparatus for downlink and uplink control management of component carriers during carrier aggregation for wireless communications may include a transceiver, a memory; and at least one processor coupled with the memory and configured to assign, at a network entity, a component carrier to a timing advance group based on one or more carrier characteristics of the component carrier, the timing advance group including one or more component carriers and a timing advance offset associated with each of the one or more component carriers. The described aspects further transmit, to a UE, the timing advance offset associated with the component carrier.

In an aspect, a computer-readable medium may store computer executable code for downlink and uplink control management of component carriers during carrier aggregation for wireless communications is described. The described aspects include code for assigning, at a network entity, a component carrier to a timing advance group based on one or more carrier characteristics of the component carrier, the timing advance group including one or more component carriers and a timing advance offset associated with each of the one or more component carriers. The described aspects further include code for transmitting, to a UE, the timing advance offset associated with the component carrier.

In an aspect, an apparatus for downlink and uplink control management of component carriers during carrier aggregation for wireless communications is described. The described aspects include means for assigning, at a network entity, a component carrier to a timing advance group based on one or more carrier characteristics of the component carrier, the timing advance group including one or more component carriers and a timing advance offset associated with each of the one or more component carriers. The described aspects further include means for transmitting, to a UE, the timing advance offset associated with the component carrier.

In accordance with another aspect, a method of downlink and uplink control management of component carriers during carrier aggregation for wireless communications. The described aspects include receiving, at a UE, a slot format indicator in at least one slot of at least one component carrier of a plurality of component carriers from a network entity, where the at least one component carrier includes a group common PDCCH, the slot format indicator within the group common PDCCH indicating at least slot structure information for one or more other component carriers from the plurality of component carriers. The described aspects further include communicating, with the network entity, using the at least slot structure information for the one more other component carriers.

In an aspect, an apparatus for downlink and uplink control management of component carriers during carrier aggregation for wireless communications may include a transceiver, a memory; and at least one processor coupled with the memory and configured to receive, at a UE, a slot format indicator in at least one slot of at least one component carrier of a plurality of component carriers from a network entity, where the at least one component carrier includes a group common PDCCH, the slot format indicator within the group common PDCCH indicating at least slot structure information for one or more other component carriers from the plurality of component carriers. The described aspects further communicate, with the network entity, using the at least slot structure information for the one more other component carriers.

In an aspect, a computer-readable medium may store computer executable code for downlink and uplink control management of component carriers during carrier aggregation for wireless communications is described. The described aspects include code for receiving, at a UE, a slot format indicator in at least one slot of at least one component carrier of a plurality of component carriers from a network entity, where the at least one component carrier includes a group common PDCCH, the slot format indicator within the group common PDCCH indicating at least slot structure information for one or more other component carriers from the plurality of component carriers. The described aspects further include code for communicating, with the network entity, using the at least slot structure information for the one more other component carriers.

In an aspect, an apparatus for downlink and uplink control management of component carriers during carrier aggregation for wireless communications is described. The described aspects include means for receiving, at a UE, a slot format indicator in at least one slot of at least one component carrier of a plurality of component carriers from a network entity, where the at least one component carrier includes a group common PDCCH, the slot format indicator within the group common PDCCH indicating at least slot structure information for one or more other component carriers from the plurality of component carriers. The described aspects further include means for communicating, with the network entity, using the at least slot structure information for the one more other component carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 is a conceptual diagram of example downlink centric slot structures for at least two component carriers with different numerologies;

FIG. 3 is a conceptual diagram of example slot structures for multiple time division duplex (TDD) downlink and uplink slots;

FIG. 6 is a conceptual diagram of example downlink centric slot structures during transmission of a cross-carrier indicator for multiple component carriers with different numerologies;

FIG. 13 is a flow diagram of an example of a method of uplink timing advance management at a network entity;

FIG. 14 is a flow diagram of an example of a method of downlink control management at a UE using a slot format indicator;

FIG. 15 is a flow diagram of an example of a method of downlink control management at a base station using a slot format indicator;

DETAILED DESCRIPTION

Figure 1:
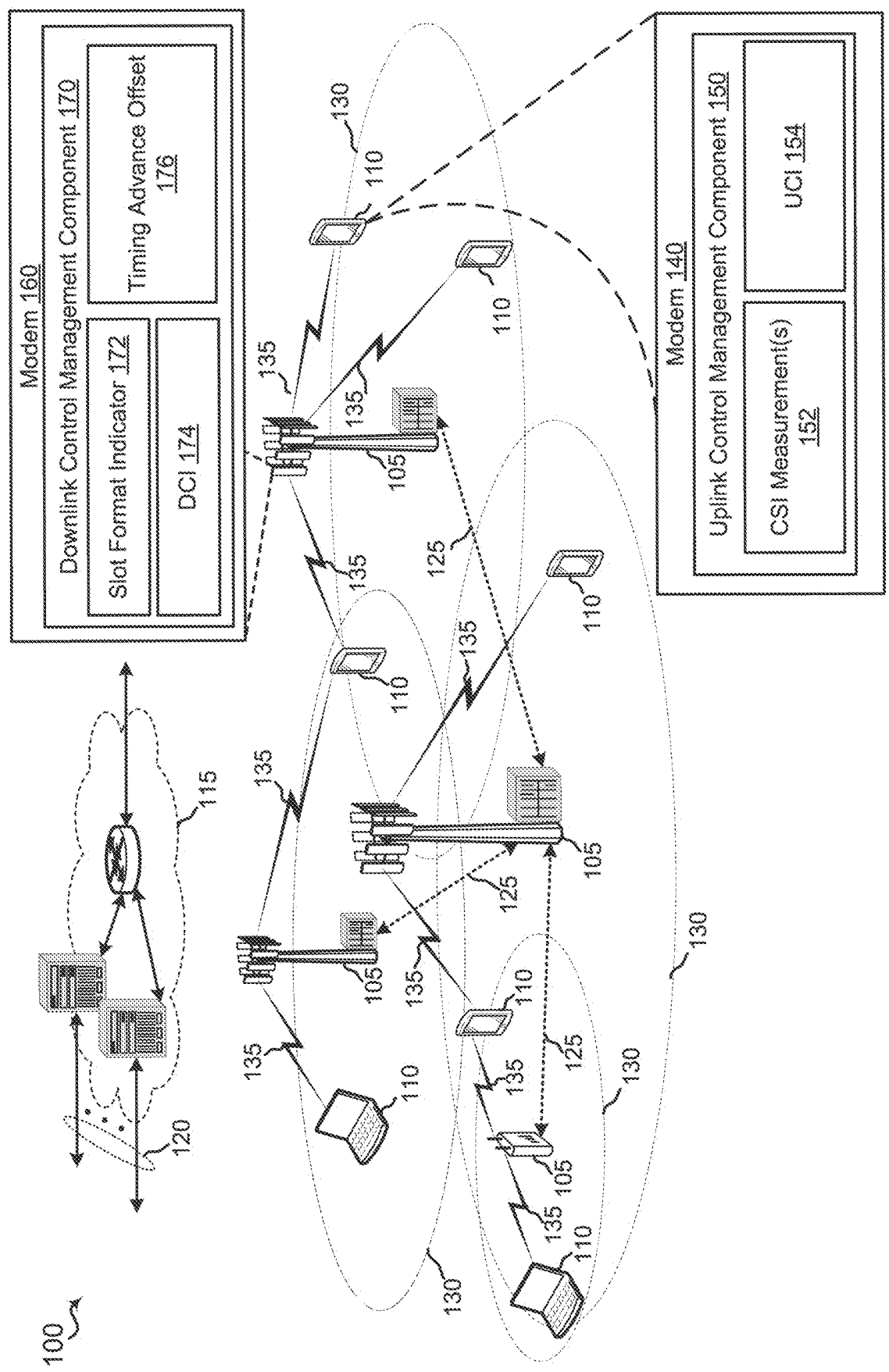
FIG. 1 is a schematic diagram of an example of a wireless communication network including at least one base station having a downlink control management component configured to manage downlink control of component carriers and at least one UE having a uplink control management component configured to manage uplink control of component carriers.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to downlink and uplink control management of component carriers during carrier aggregation in a new radio wireless communication system. In an example, current LTE carrier aggregation configurations includes frequency division duplex (FDD)+ FDD (Rel-10), time division duplex (TDD)+TDD of same subframe configuration (Rel-10), TDD+TDD of different subframe configurations (Rel-11), FDD+TDD (Rel-12), and from 5 to 32 component carriers in carrier aggregation (Rel-13). Specifically for the downlink, same and cross-carrier scheduling occurs. This includes Pcell only (pScell in dual connectivity) common search space (CSS) monitoring, channel state information (CSI) measurement, reporting, processing limitations, collision handling, etc. (e.g., Physical Control Format Indicator Channel (PCFICH)/Physical Hybrid-ARQ Indicator Channel (PHICH), softer buffer management). For the uplink, this includes Pcell only (pScell in dual-Physical Uplink Control Channel (PUCCH) carrier aggregation or dual connectivity) PUCCH transmission, various PUCCH formats (1/2/3/4/5), single PUSCH for UCI handling, etc. (e.g., SRS/PUCCH/Physical Uplink Shared Channel (PUSCH)/multiple Timing Advance Groups (TAGs)/etc.). As such, for LTE carrier aggregation, the same subframe structure and numerology are used. Moreover, in LTE Rel-14, the introduction of sTTI enables carrier aggregation with sTTI and 1-ms.

Accordingly, for new radio wireless communication systems a need exists for utilizing different slot durations and numerologies. For example, new radio wireless communication systems need to cover a wide range of carrier frequencies, such as, sub-6 GHz and/or millimeter waves. Further, new radio wireless communication systems require different slot durations, such as, 0.5 ms slot, 0.25 ms slot, etc. Moreover, new radio wireless communication systems require different numerologies/tone spacings, such as, 15 kHz, 30 kHz, 60 kHz, 120 kHz, etc. Therefore, carrier aggregation and dual connectivity for new radio wireless communication systems need to accommodate different numerologies in different component carriers configured for a UE.

In an implementation at the network (e.g., gNB), according to one example, a method of wireless communication may include generating, at a network entity (e.g., gNB), a slot format indicator for at least one component carrier, each component carrier including a group common PDCCH, the slot format indicator indicating at least slot structure information for one or more other component carriers within the group common PDCCH, and transmitting, to a UE, the slot format indicator in at least one slot of the at least one component carrier. Another method may include determining, at a network entity, whether cross-carrier scheduling for two or more component carriers with different numerologies is enabled, generating at least one DCI for at least one of the two or more component carriers based on a determination that cross-carrier scheduling is enabled, the DCI indicating at least slot structure information for one or more other component carriers of the two or more component carriers, and transmitting, to a UE, the at least one DCI in at least one slot of the at least one of the two or more component carriers. Another method may include assigning, at a network entity, a component carrier to a timing advance group based on one or more carrier characteristics of the component carrier, the timing advance group including one or more component carriers and a timing advance offset associated with each of the one or more component carriers, and transmitting, to a UE, the timing advance offset associated with the component carrier.

In an implementation at a UE, an example method of wireless communications includes receiving, at a UE, an indication to trigger CSI measurements in at least two or more component carriers, the indication included within DCI received in a slot of one of the at least two or more component carriers, determining a measurement configuration for performing the CSI measurements in the at least two or more component carriers, performing the CSI measurements in the at least two or more component carriers based on the measurement configuration, and transmitting, to a network entity, the CSI measurements for the at least two or more component carriers. Another method includes generating, at a UE, UCI for at least one component carrier, the UCI including uplink information for at least one or more other component carriers, and transmitting, to a network entity, the UCI in at least one slot of the at least one component carrier.

Additional features of the present aspects are described in more detail below with respect to FIGS. 1-17.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a uplink control management component 150 that performs management of uplink control of component carriers in a new radio wireless communication system. Further, wireless communication network 100 includes at least one base station 105 with a modem 160 having a downlink control management component 170 that is configured to manage downlink control of component carriers.

In an aspect, the base station 105 may execute the downlink control management component 170 to generate a slot format indicator 172 for at least one component carrier, each component carrier including a group common Physical Downlink Control Channel (PDCCH), and the slot format indicator 172 indicating at least slot structure information for one or more other component carriers within the group common PDCCH. The base station 105 and/or downlink control management component 170 may transmit the slot format indicator 172 in at least one slot of the at least one component carrier.

In an aspect, the base station 105 may execute the downlink control management component 170 to determine whether cross-carrier scheduling for two or more component carriers with different numerologies is enabled. The base station 105 may execute the downlink control management component 170 to generate at least one Downlink Control Information (DCI) 174 for at least one of the two or more component carriers based on a determination that cross-carrier scheduling is enabled. The DCI 174 indicates at least slot structure information for one or more other component carriers of the two or more component carriers. The base station 105 may execute the downlink control management component 170 to transmit the at least one DCI 174 in at least one slot of the at least one of the two or more component carriers.

In an aspect, the base station 105 may execute the downlink control management component 170 to assign a component carrier to a timing advance group based on one or more carrier characteristics of the component carrier, the timing advance group including one or more component carriers and a timing advance offset 176 associated with each of the one or more component carriers. The base station 105 may execute the downlink control management component 170 to transmit the timing advance offset 176 associated with the component carrier.

In an aspect, the UE 110 may execute the uplink control management component 150 to receive an indication to trigger Channel State Information (CSI) measurements 152 in at least two or more component carriers, the indication included within the DCI 174 received in a slot of one of the at least two or more component carriers. The UE 110 may execute the uplink control management component 150 to determine a measurement configuration for performing the CSI measurements 152 in the at least two or more component carriers. The UE 110 may execute the uplink control management component 150 to perform the CSI measurements 152 in the at least two or more component carriers based on the measurement configuration. The UE 110 may execute the uplink control management component 150 to transmit the CSI measurements 152 for the at least two or more component carriers.

In aspect, the UE 110 may execute the uplink control management component 150 to generate an Uplink Control Information (UCI) 154 for at least one component carrier, the UCI 154 including uplink information for at least one or more other component carriers. The UE 110 may execute the uplink control management component 150 to transmit the UCI 154 in at least one slot of the at least one component carrier.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Referring to FIG. 2, a conceptual diagram of example downlink centric slot structures 200 for at least two component carriers with different numerologies based on the techniques described herein. For example, the UE 110 may execute the uplink control management component 150 and the base station 105 may execute the downlink control management component 170 to communicate via component carriers CC1 and CC2 using carrier aggregation based on the downlink centric slot structures 200 described herein.

In this example of the downlink centric slot structures 200, the numerologies of CC1 and CC2 are described. CC1 may be configured with a slot length x (e.g., 0.5 ms) while CC2 may be configured with a slot length y (e.g., 0.25 ms). Further, CC1 may be configured with 30 kHz tone spacing and 14 symbols for each slot. CC2 may be configured with 60 kHz tone spacing and 14 symbols for each slot. In another example, component carrier with 60 kHz may still be configured with a 0.5 s slot, but may have different transmission time intervals (TTI) for scheduling.

In an aspect, each slot of each component carrier may be configured with a number of regions, including a downlink control region, a downlink data region, a gap region, and an uplink control region. In an example, the gap region corresponds to a region in which no transmissions occur between the UE 110 and base station 105.

Referring to FIG. 3, a conceptual diagram of example slot structures 300 for multiple time division duplex (TDD) downlink and uplink slots is described. In an aspect, for TDD downlink centric slot, the slot structure may include downlink burst regions with a portion designated for PDCCH. The TDD downlink centric slot may also include an uplink control region with a portion designated for PUCCH. In an aspect, for a TDD downlink only slot, the slot structure may include downlink burst regions with a portion designated for PDCCH. Unlike the TDD downlink centric slot, the TDD downlink only slot does not include an uplink control region.

In an aspect, for a TDD uplink centric slot, the slot structure may include uplink burst regions with one or more portions designated for PUCCH. The TDD uplink centric slot may also include a downlink burst region with a portion designated for PDCCH. In an aspect, for a TDD uplink only slot, the slot structure may include uplink burst regions with one or more portions designated for PUCCH. Unlike the TDD uplink centric slot, the TDD uplink only slot does not include a downlink burst region.

Figure 4:
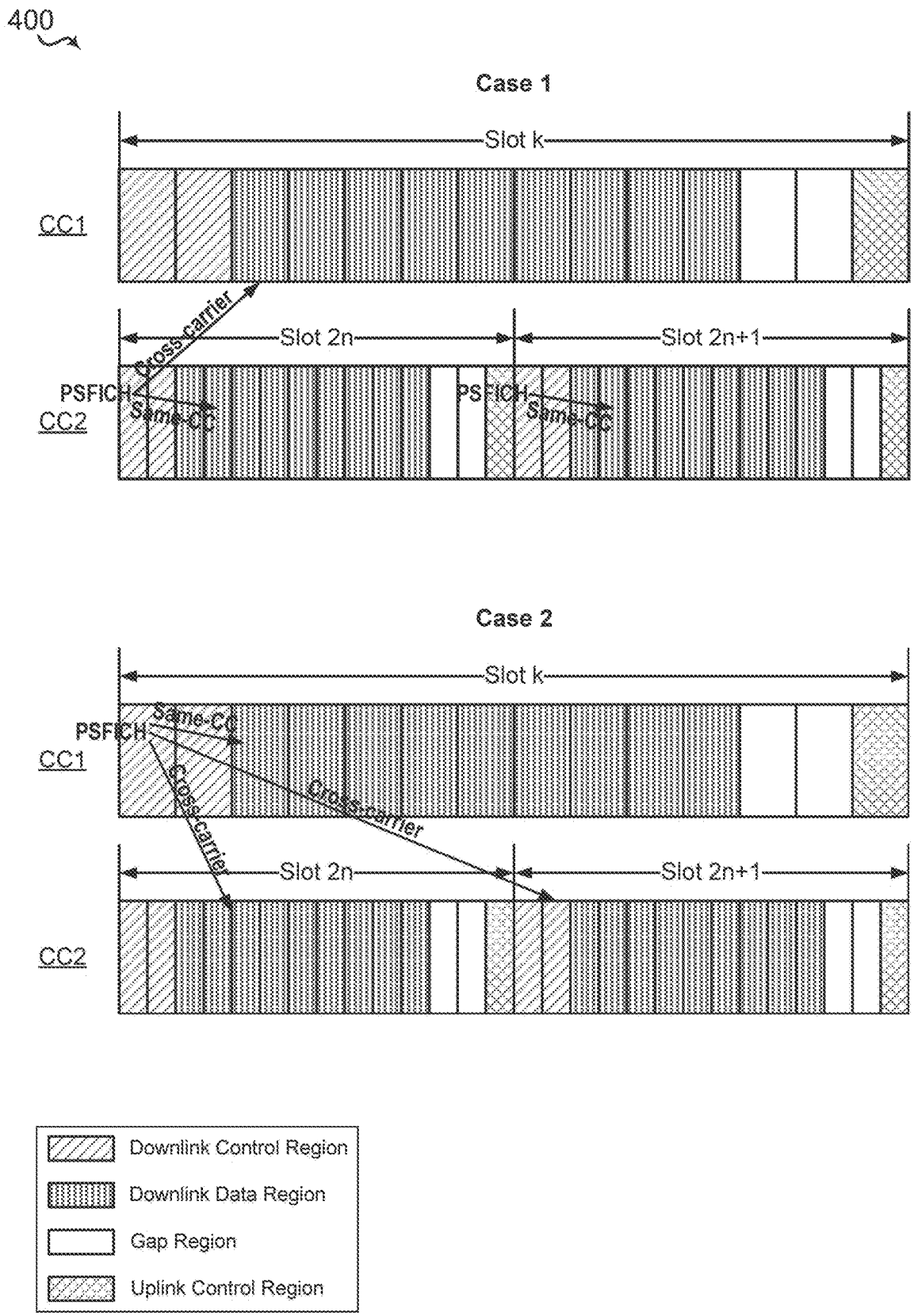
FIGS. 4 and 5 are conceptual diagrams of example downlink centric slot structures during transmission of a cross-carrier indicator for multiple component carriers with a group common PDCCH and different numerologies.
Figure 5:
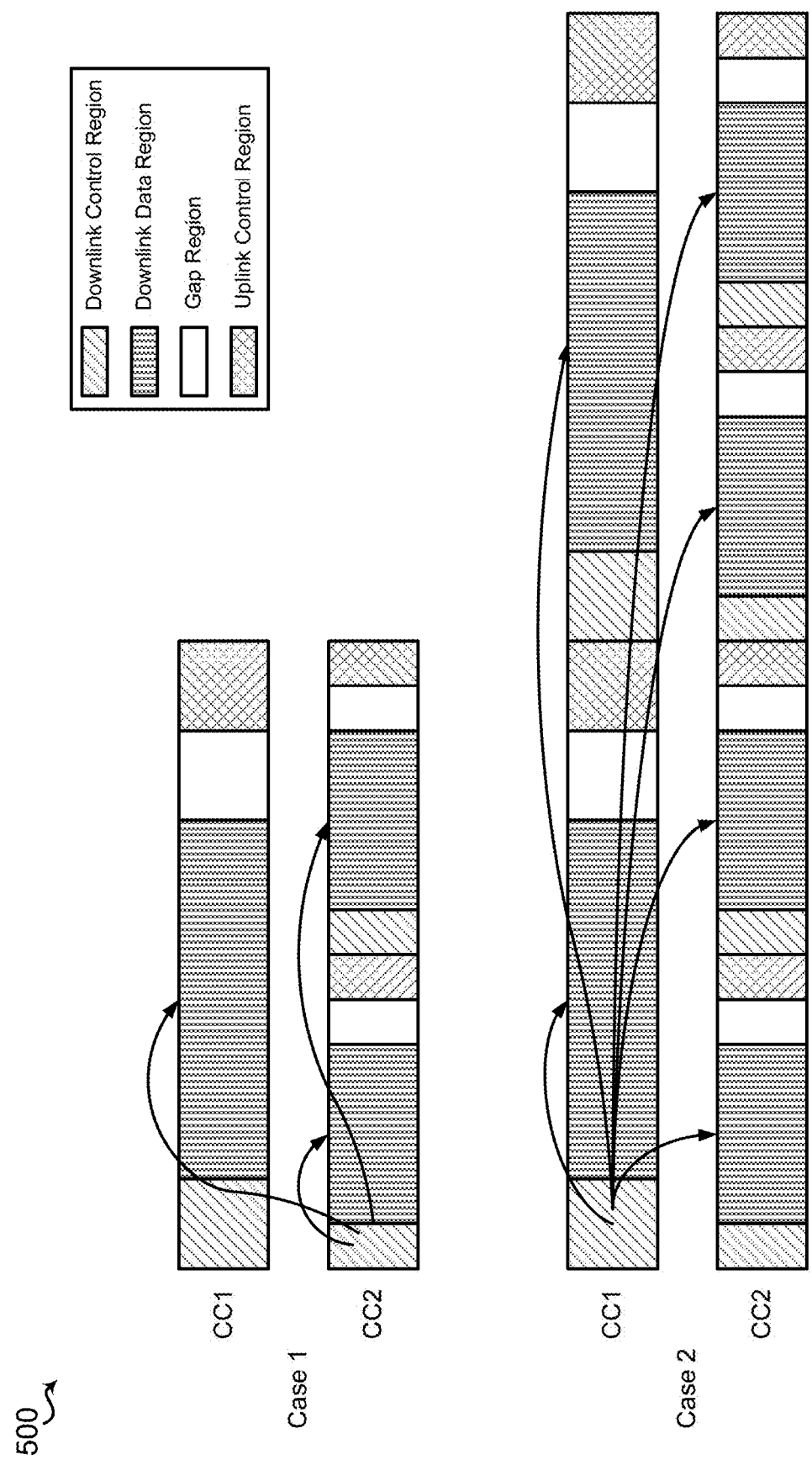

Referring to FIGS. 4 and 5, conceptual diagrams of example downlink centric slot structures 400 and 500 during transmission of a cross-carrier indicator for multiple component carriers with a group common PDCCH and different numerologies are described. A network entity, such as base station 105 (FIG. 1) may execute the downlink control management component 170 to configure a component carrier (e.g., CC1) with a longer time duration to schedule a component carrier (e.g., CC2) with a shorter time duration or vice versa.

For example, CC1 may be configured with a slot k of a slot length (e.g., 0.5 ms) while CC2 may be configured with a slots 2n and 2n+1, each with a slot length (e.g., 0.25 ms). Further, CC1 may be configured with 30 kHz tone spacing and 14 symbols for each slot. CC2 may be configured with 60 kHz tone spacing and 14 symbols for each slot. In another example, component carrier with 60 kHz may still be configured with a 0.5 s slot, but may have a different TTI for scheduling.

In an aspect, with regard to downlink centric slot structure 400, for Case 1, a component carrier (e.g., CC2) with a shorter-slot duration carrying group common PDCCH (or a.k.a. PSFICH (Physical Slot Format Indicator Channel)) indicating for a component carrier (e.g., CC1) with a longer-slot-duration. For example, cross-carrier group common PDCCH may be enabled only in a subset of slots (e.g., slots 2n in CC2 may carry the cross-carrier group common PDCCH for CC1).

In an aspect, for Case 2, a component carrier (e.g., CC1) with a longer-slot duration carrying group common PDCCH indicating for a component carrier (e.g., CC2) with a shorter-slot-duration. For example, cross-carrier group common PDCCH may be enabled to indicate two or more slots in one group common PDCCH for the cross-carrier indicated component carrier (e.g., where group common PDCCH in slot k of CC1 indicates the slot structures of slot 2n and slot 2n+1 for CC2). Further, in another example, slot 2n and slot 2n+1 may be restricted to have the same slot structure, such as, a single indicator for CC2. In another example, another group common PDCCH channel is enabled on CC1 in the middle of the slot. In a further example, for CC2 slot 2n, cross-carrier may be indicated by group common PDCCH on CC1, but for CC2 slot 2n+1, it is same-carrier indicated by group common PDCCH on CC2. Then group common PDCCH for CC2 is only present in odd slots.

In some aspects, Case 1 and Case 2 for a combination of component carriers may change dynamically if the slot structure(s) of component carrier(s) in carrier aggregation and dual connectivity change dynamically. For example, CC1 may cross-carrier indicate the slot structure for CC2, but CC1's slot duration may be longer and/or shorter at a given time instance depending on the dynamic slot duration management at CC1 and/or CC2.

In an aspect, with regard to downlink centric slot structure 500, a component carrier may include a group common PDCCH that carries slot formats for multiple slots. A network entity, such as base station 105 (FIG. 1) may execute the downlink control management component 170 to configure a component carrier (e.g., CC1) with a longer time duration schedule a component carrier (e.g., CC2) with a shorter time duration or vice versa. In an example, for Case 1, a component carrier (e.g., CC2) with a shorter-slot duration carrying group common PDCCH (or a.k.a. PSFICH) including multiple indications for a component carrier (e.g., CC1) with a longer-slot-duration and the component carrier itself. In another example, for Case 2, a component carrier (e.g., CC1) with a longer-slot duration carrying group common PDCCH including multiple indications for a component carrier (e.g., CC2) with a shorter-slot-duration and the component carrier itself.

In an aspect, cross-carrier group common PDCCH may be disallowed for component carriers of different slot durations. For example, component carriers of the same slot duration can be grouped together and cross-carrier indicated. The cross-carrier group common PDCCH indicator may be carried in the same channel as same-carrier group common PDCCH indicator, or a separate channel. In another example, a single group common PDCCH channel on CC1 indicates slot structure for CC1 and CC2, or a first group common PDCCH channel on CC1 indicates slot structure for CC1 and a second group common PDCCH channel on CC1 indicates slot structure for CC2.

Referring to FIG. 6, a conceptual diagram of example downlink centric slot structures 600 during transmission of a cross-carrier indicator for multiple component carriers with different numerologies are described.

In an aspect, for UE-specific scheduling, cross-carrier scheduling may be considered among component carriers of different numerologies. For example, if cross-carrier scheduling among component carriers of different numerologies is enabled, a network entity, such as base station 105 (FIG. 1) may execute the downlink control management component 170 to configure a component carrier (e.g., CC1) with a longer time duration (e.g., 15 kHz tone spacing) schedule a component carrier (e.g., CC2) with a shorter time duration (e.g., 30 kHz tone spacing) or vice versa.

In an aspect, for Case 1, a component carrier (e.g., CC2) with a shorter-slot duration carries cross-schedule DCI for a component carrier (e.g., CC1) with a longer-slot-duration. For example, one PDCCH search space may include cross-schedule DCI for another component carrier in a slot (e.g., slot 2n), but not in the next slot (e.g., slot 2n+1).

In an aspect, for Case 2, a component carrier (e.g., CC1) with a longer-slot duration carries cross-schedule DCI for a component carrier (e.g., CC2) with a shorter-slot-duration. For example, one PDCCH search space cross-schedules two or more DCIs for two or more slots (e.g., slot k on CC1 schedules PDSCH or PUSCH on CC2 in slot 2n and slot 2n+1). In another example, a single DCI on CC1 cross-schedules slot 2n and slot 2n+1 on CC2 (e.g., joint DCI), which may have some restrictions in scheduling flexibility (e.g., slot 2n and slot 2n+1 have the same scheduled MCS).

Figure 7:
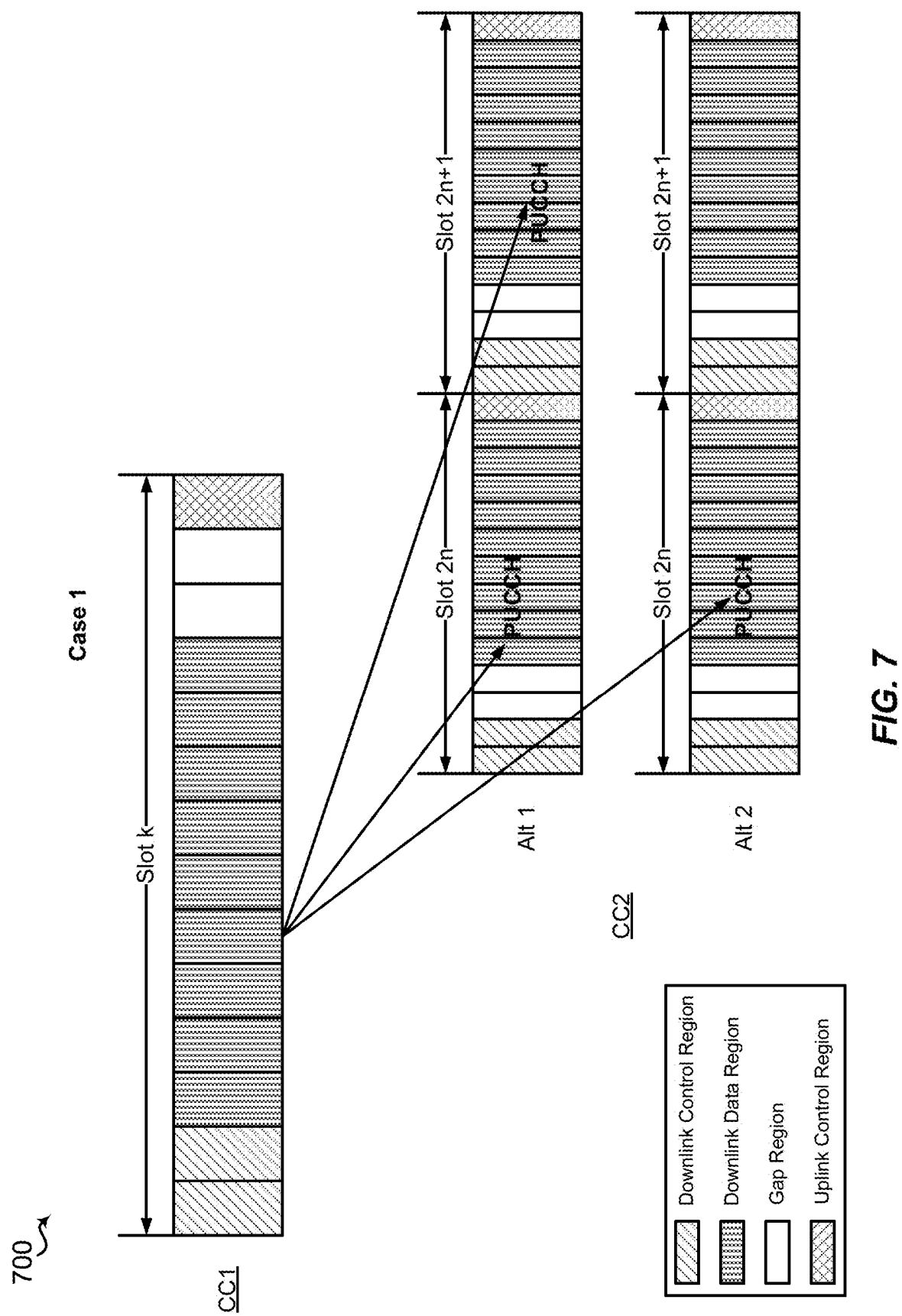
FIGS. 7 and 8 are conceptual diagrams of example downlink centric slot structures during transmission of UCI for multiple component carriers with different numerologies.
Figure 8:
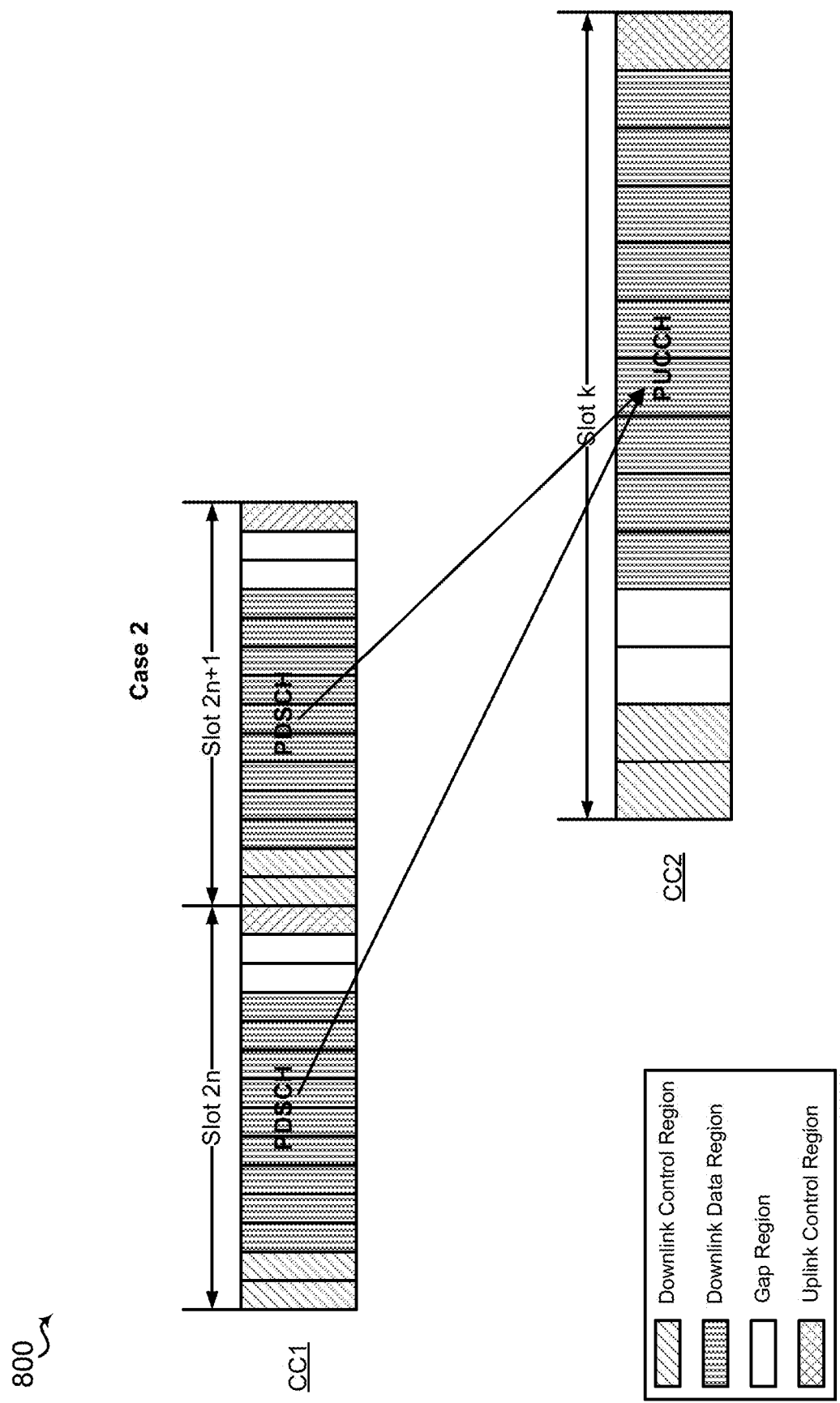

Referring to FIGS. 7 and 8, conceptual diagrams of example downlink centric slot structures 700 and 800 during transmission of UCI for multiple component carriers with different numerologies are described. For example, a UE, such as UE 110 (FIG. 1) may execute the uplink control management component 150 to configure a component carrier (e.g., CC1) with a longer time duration to provide uplink feedback for a component carrier (e.g., CC2) with a shorter time duration or vice versa. That is, a single PUCCH may provide UCI (e.g., an acknowledgement signal (ACK), a negative acknowledgement signal (NACK), a scheduling request (SR), a Channel Quality Indicator (CQI), or a Channel State Information (CSI)) for component carriers of different numerologies.

In an aspect, for Case 1 of downlink centric slot structure 700, one PDSCH has one or more PUCCHs providing hybrid access request (HARQ) feedback. For example, the feedback of UCI for CC1 may be transmitted in two or more PUCCHs on CC2. In another example, the feedback of UCI for CC1 is only in PUCCH on CC2 in some slots (e.g., slots 2n, but not slots 2n+1).

In an aspect, for Case 2 of downlink centric slot structure 800, one PUCCH carries two or more PDSCHs. For example, slot k on CC2 carries HARQ response for slots 2n and 2n+1 PDSCH transmissions.

Figure 9:
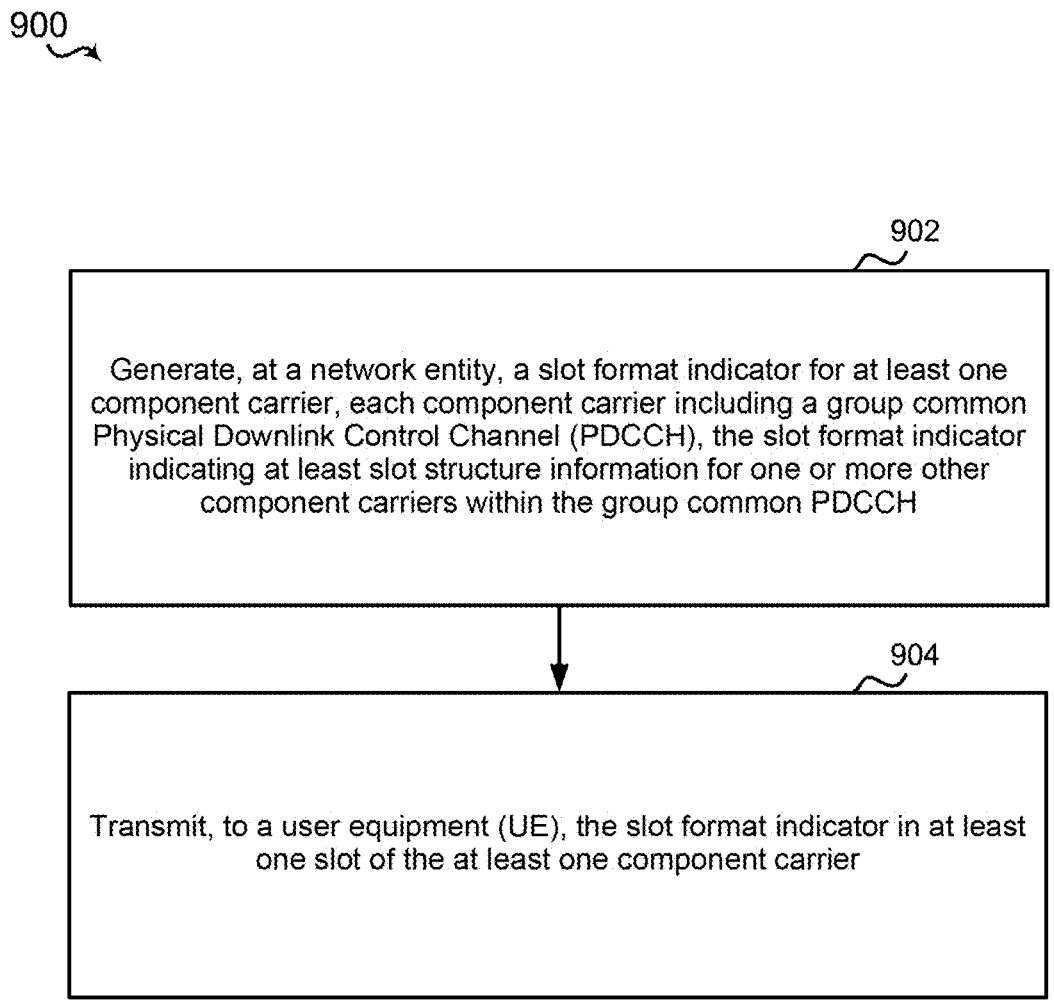
FIG. 9 is a flow diagram of an example of a method of downlink control management at a network entity using a slot format indicator.

Referring to FIG. 9, for example, a method 900 of wireless communication in operating base station 105 according to the above-described aspects for downlink control management using a slot format indicator in a new radio wireless communication system includes one or more of the herein-defined actions.

At block 902, the method 900 may generate, at a network entity, a slot format indicator for at least one component carrier, each component carrier including a group common Physical Downlink Control Channel (PDCCH), the slot format indicator indicating at least slot structure information for one or more other component carriers within the group common PDCCH. For example, the base station 105 may execute the downlink control management component 170 to generate a slot format indicator 172 for at least one component carrier, each component carrier including a group common PDCCH, the slot format indicator 172 indicating at least slot structure information for one or more other component carriers within the group common PDCCH.

In an aspect, a slot duration corresponding to the at least one component carrier is shorter than a slot duration corresponding to the one or more other component carriers.

In an aspect, a slot duration corresponding to the at least one component carrier is longer than a slot duration corresponding to the one or more other component carriers.

In an aspect, the slot format indicator 172 corresponds to a group common PDCCH.

In an aspect, the slot format indicator 172 further indicates a slot structure information for the at least one component carrier carrying the slot format indicator.

In an aspect, the slot format indicator 172 further indicates a respective slot structure for multiple slots of the one or more other component carriers and the at least one component carrier.

At block 904, the method 900 may transmit, to a UE, the slot format indicator in at least one slot of the at least one component carrier. For example, the base station 105 may execute the downlink control management component 170 to transmit, to a UE 110, the slot format indicator 172 in at least one slot of the at least one component carrier.

In an aspect, method 900 includes transmitting, to the UE 110, a second slot format indicator in at least a second slot of the at least one component carrier, the second slot format indicator indicating a slot structure information for the at least one component carrier.

Figure 10:
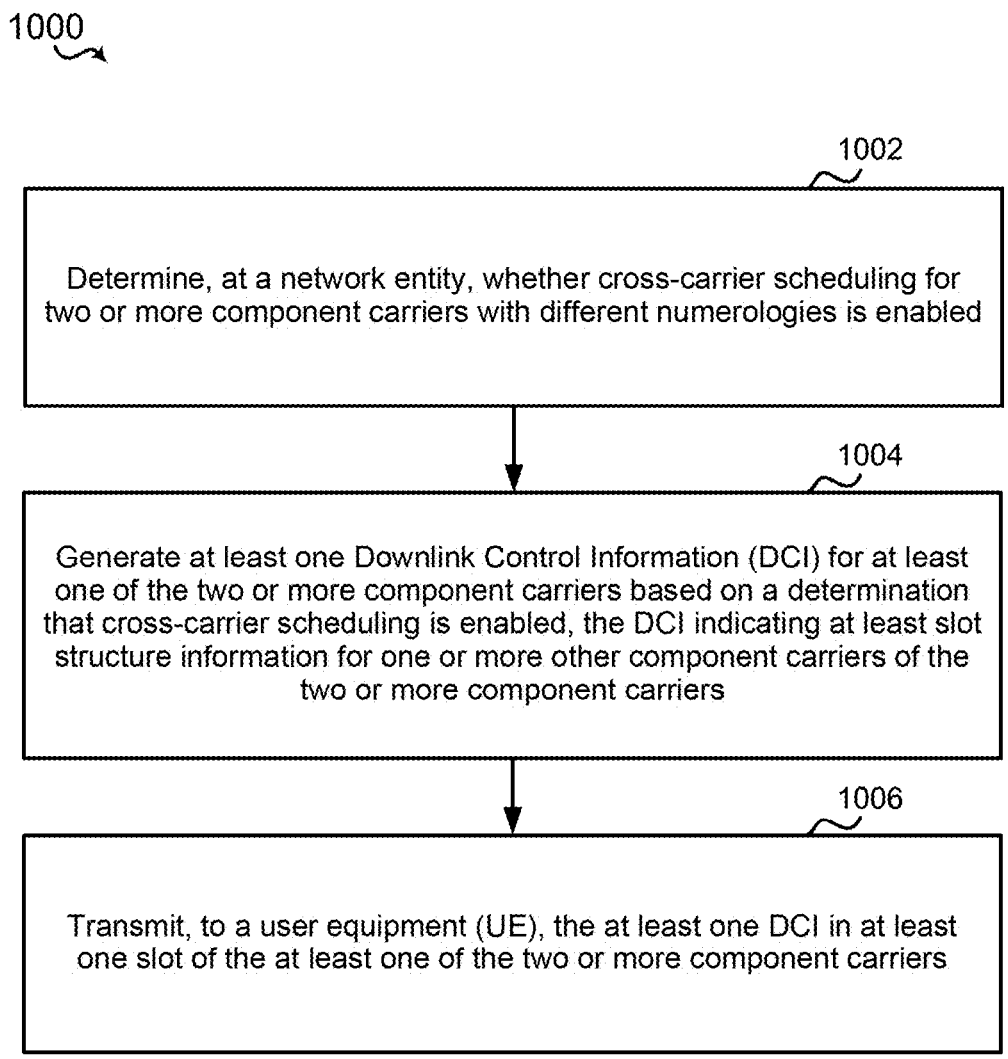
FIG. 10 is a flow diagram of an example of a method of downlink control management at a network entity using a DCI.

Referring to FIG. 10, for example, a method 1000 of wireless communication in operating base station 105 according to the above-described aspects for downlink control management using a DCI in a new radio wireless communication system includes one or more of the herein-defined actions.

At block 1002, the method 1000 may determine, at a network entity, whether cross-carrier scheduling for two or more component carriers with different numerologies is enabled. For example, the base station 105 may execute the downlink control management component 170 to determine whether cross-carrier scheduling for two or more component carriers with different numerologies is enabled.

At block 1004, the method 1000 may generate at least one DCI for at least one of the two or more component carriers based on a determination that cross-carrier scheduling is enabled, the DCI indicating at least slot structure information for one or more other component carriers of the two or more component carriers. For example, the base station 105 may execute the downlink control management component 170 to generate at least one DCI 174 for at least one of the two or more component carriers based on a determination that cross-carrier scheduling is enabled, the DCI 174 indicating at least slot structure information for one or more other component carriers of the two or more component carriers.

At block 1006, the method 1000 may transmit, to a UE, the at least one DCI in at least one slot of the at least one of the two or more component carriers. For example, the base station 105 may execute downlink control management component 170 to transmit, to a UE 110, the at least one DCI 174 in at least one slot of the at least one of the two or more component carriers.

In an aspect, a slot duration corresponding to the at least one of the two or more component carriers is shorter than a slot duration corresponding to other ones of the two or more other component carriers.

In an aspect, a slot duration corresponding to the at least one of the two or more component carriers is longer than a slot duration corresponding to other ones of the two or more other component carriers.

In an aspect, method 1000 includes transmitting the at least one DCI 174 in at least one slot of the at least one of the two or more component carriers further comprises transmitting the at least one DCI in a PDCCH search space.

Figure 11:
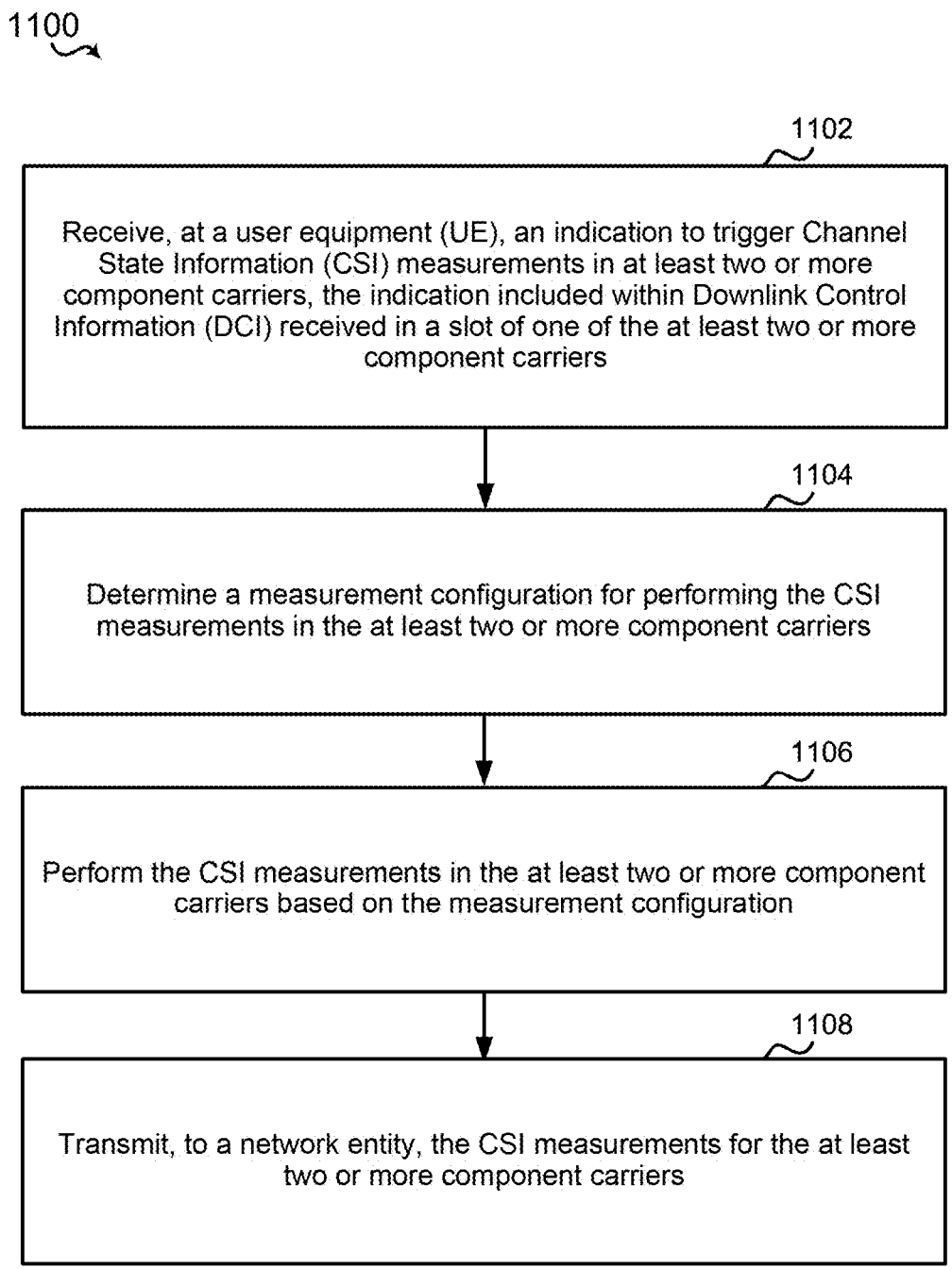
FIG. 11 is a flow diagram of an example of a method of CSI management at a UE.

Referring to FIG. 11, for example, a method 1100 of wireless communication in operating UE 110 according to the above-described aspects for uplink control management, such as CSI management, in a new radio wireless communication system includes one or more of the herein-defined actions.

At block 1102, the method 1100 may receive, at UE, an indication to trigger CSI measurements in at least two or more component carriers, the indication included within DCI received in a slot of one of the at least two or more component carriers. For example, the UE 110 may execute the uplink control management component 150 to receive an indication to trigger CSI measurements 152 in at least two or more component carriers, the indication included within DCI 174 received in a slot of one of the at least two or more component carriers.

At block 1104, the method 1100 may determine a measurement configuration for performing the CSI measurements in the at least two or more component carriers. For example, the UE 110 may execute the uplink control management component 150 to determine a measurement configuration for performing the CSI measurements 152 in the at least two or more component carriers.

At block 1106, the method 1100 may perform the CSI measurements in the at least two or more component carriers based on the measurement configuration. For example, the UE 110 may execute the uplink control management component 150 to perform the CSI measurements 152 in the at least two or more component carriers based on the measurement configuration.

At block 1108, the method 1100 may transmit, to a network entity, the CSI measurements for the at least two or more component carriers. For example, the UE 110 may execute the uplink control management component 150 to transmit, to base station 105, the CSI measurements 152 for the at least two or more component carriers.

In an aspect, uplink control management component 150 configured for determining the measurement configuration for performing the CSI measurements 152 in the at least two or more component carriers further comprises determining whether measurements slots for each of the at least two or more component carriers are located at or after the slot of the one of the at least two or more component carriers. Further, uplink control management component 150 configured for performing the CSI measurements 152 in the at least two or more component carriers based on the measurement configuration further comprises performing the CSI measurements 152 in the at least two or more component carriers based on a determination that the measurements slots for each of the at least two or more component carriers are located at or after the slot of the one of the at least two or more component carriers.

In an aspect, method 1100 includes uplink control management component 150 configured to omit performing the CSI measurements 152 for any of the at least two or more component carriers with measurement slots located before the slot of the one of the at least two or more component carriers.

In an aspect, uplink control management component 150 configured for determining the measurement configuration for performing the CSI measurements 152 in the at least two or more component carriers further comprises determining whether measurements slots for each of the at least two or more component carriers are located at or after an immediate precoding slot relative to the slot of the one of the at least two or more component carriers containing the DCI triggering the CSI reporting. Further, uplink control management component 150 configured for performing the CSI measurements 152 in the at least two or more component carriers based on the measurement configuration further comprises performing the CSI measurements 152 in the at least two or more component carriers based on a determination that the measurements slots for each of the at least two or more component carriers are located at or after an immediate precoding slot relative to the slot of the one of the at least two or more component carriers.

Figure 12:
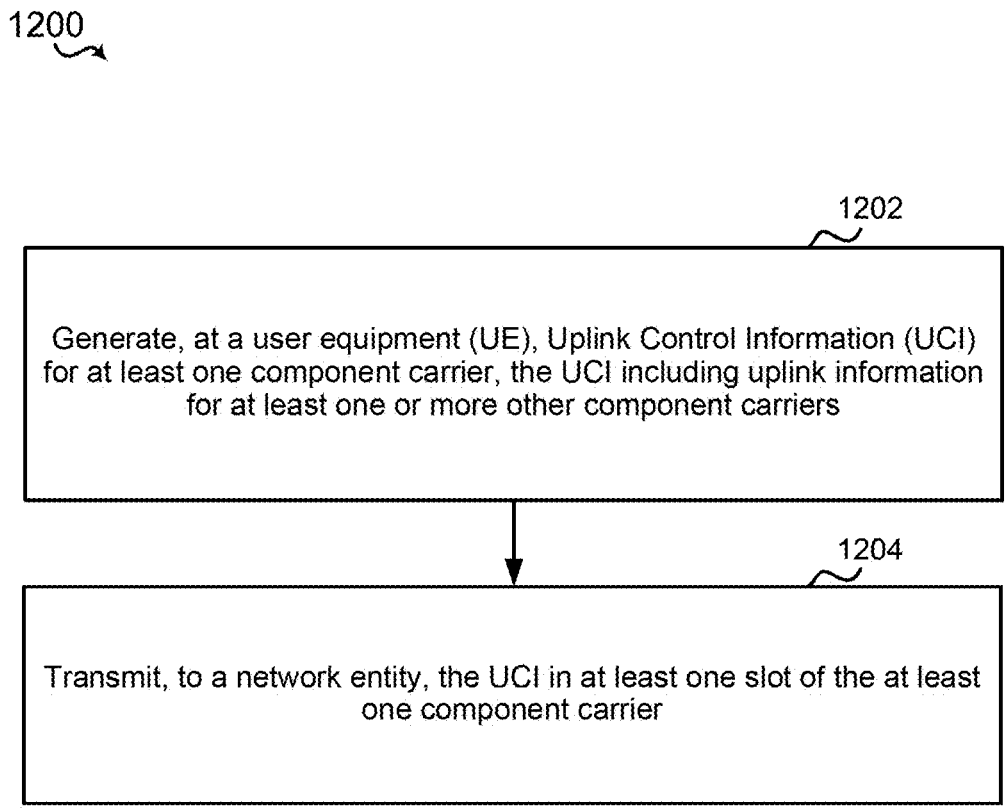
FIG. 12 is a flow diagram of an example of a method of managing UCI at a UE.

Referring to FIG. 12, for example, a method 1200 of wireless communication in operating UE 110 according to the above-described aspects for uplink control management, such as UCI transmission, in a new radio wireless communication system includes one or more of the herein-defined actions.

At block 1202, the method 1200 may generate, at a UE, UCI for at least one component carrier, the UCI including uplink information for at least one or more other component carriers. For example, the UE 110 may execute the uplink control management component 150 to generate UCI 154 for at least one component carrier, the UCI 154 including uplink information for at least one or more other component carriers.

At block 1204, the method 1200 may transmit, to a network entity, the UCI in at least one slot of the at least one component carrier. For example, the UE 110 may execute the uplink control management component 150 to transmit, to base station 105, the UCI 154 in at least one slot of the at least one component carrier.

In an aspect, the UCI corresponds to at least one of an acknowledgement signal, a negative acknowledgement signal, a scheduling request, a CQI, or a CSI.

In an aspect, method 1200 includes uplink control management component 150 configured to transmit the UCI 154 in a PUCCH in a different component carrier, where the UCI 154 can be repeated or be transmitted in a subset of slots in case the slot duration of carrying the UCI 154 is shorter than the slot corresponding to the DL data transmission.

In an aspect, uplink control management component 150 configured to transmit the UCI further comprises transmitting the UCI in a Physical Uplink Control Channels (PUCCH) that corresponds to two or more Physical Downlink Shared Channel (PDSCH).

In an aspect, the at least one or more other component carriers are configured with different numerologies than the at least one component carrier.

Referring to FIG. 13, for example, a method 1300 of wireless communication in operating base station 105 according to the above-described aspects for downlink control management using a timing advance offset in a new radio wireless communication system includes one or more of the herein-defined actions.

At block 1302, the method 1300 may assign, at a network entity, a component carrier to a timing advance group based on one or more carrier characteristics of the component carrier, the timing advance group including one or more component carriers and a timing advance associated with each of the one or more component carriers. For example, the base station 105 may execute the downlink control management component 170 to assign a component carrier to a timing advance group based on one or more carrier characteristics of the component carrier, the timing advance group including one or more component carriers and a timing advance offset 176 associated with each of the one or more component carriers.

At block 1304, the method 1300 may transmit, to a UE, the timing advance offset associated with the component carrier. For example, the base station 105 may execute the downlink control management component 170 to transmit, to a UE 110, the timing advance offset 176 associated with the component carrier.

In an aspect, the one or more carrier characteristics includes a numerology of the component carrier.

In an aspect, the one or more component carriers included in the timing advance group are configured with different numerologies. Further, method 1300 may include utilizing one of a primary cell or a primary secondary cell as a reference to determine the timing advance offset 176.

Referring to FIG. 14, for example, a method 1400 of wireless communication in operating UE 110 according to the above-described aspects for downlink control management using a timing advance offset in a new radio wireless communication system includes one or more of the herein-defined actions.

At block 1402, the method 1400 may receive, at a UE, a slot format indicator in at least one slot of at least one component carrier of a plurality of component carriers from a network entity, where the at least one component carrier includes a group common PDCCH, the slot format indicator within the group common PDCCH indicating at least slot structure information for one or more other component carriers from the plurality of component carriers. For example, the UE 110 may execute the uplink control management component 150 to receive a slot format indicator 172 in at least one slot of at least one component carrier of a plurality of component carriers from a network entity 105, where the at least one component carrier includes a group common PDCCH, the slot format indicator 172 within the group common PDCCH indicating at least slot structure information for one or more other component carriers from the plurality of component carriers.

At block 1404, the method 1400 may communicate, with the network entity, using the at least slot structure information for the one more other component carriers. For example, the UE 110 may execute the uplink control management component 150 to communicate, with the network entity 105, using the at least slot structure information for the one more other component carriers.

In an aspect of method 1400, a slot duration that corresponds to the at least one component carrier is shorter than a slot duration that corresponds to the one or more other component carriers.

In an aspect of method 1400, a slot duration that corresponds to the at least one component carrier is longer than a slot duration that corresponds to the one or more other component carriers.

In an aspect of method 1400, for example, the UE 110 may execute the uplink control management component 150 to receive a second PDCCH on a second component carrier from the plurality of component carriers, where the PDCCH conveys a slot format indicator 172 for at least one slot of the second component carrier.

In an aspect of method 1400, the slot format indicator 172 further indicates a slot structure information for the at least one component carrier carrying the slot format indicator 172.

In an aspect of method 1400, for example, the UE 110 may execute the uplink control management component 150 to receive a second slot format indicator 172 in at least a second slot of the at least one component carrier, the second slot format indicator 172 indicating a slot structure information for the at least one component carrier.

In an aspect of method 1400, the slot format indicator 172 further indicates a respective slot structure for multiple slots of the one or more other component carriers and the at least one component carrier.

In an aspect of method 1400, the at least one component carrier and the one or more other component carriers have different numerologies.

In an aspect of method 1400, the UE 110 may execute the uplink control management component 150 to receive an indication to trigger CSI measurements 152 for the one or more other component carriers, the indication included within DCI 174 received in a slot of the at least one component carrier, determine a measurement configuration for performing the CSI measurements 152 in the one or more other component carriers, perform the CSI measurements 152 in the one or more other component carriers based on the measurement configuration, and transmit, to the network entity 105, the CSI measurements 152 for the one or more other component carriers.

In an aspect of method 1400, the UE 110 may execute the uplink control management component 150 to determine whether measurements slots for each of the one or more other component carriers are located at or after the slot of the at least one component carrier and perform the CSI measurements 152 in the one or more other component carriers based on a determination that the measurements slots for each of the one or more other component carriers are located at or after the slot of the at least one component carrier.

In an aspect of method 1400, the UE 110 may execute the uplink control management component 150 to omit performing the CSI measurements 152 for at least one of the one or more other component carriers with measurement slots located before the slot of the at least one component carrier.

In an aspect of method 1400, the UE 110 may execute the uplink control management component 150 to generate Uplink Control Information (UCI) 154 in the at least one component carrier, the UCI 154 including uplink information for the one or more other component carriers, and transmit, to a network entity 105, the UCI 154 in at least one slot of the at least one component carrier. For example, the UCI 154 corresponds to at least one of an acknowledgement signal, a negative acknowledgement signal, a scheduling request, a Channel Quality Indicator (CQI), or a Channel State Information (CSI).

In an aspect of method 1400, the UE 110 may execute the uplink control management component 150 to transmit the UCI 154 in a Physical Uplink Control Channel (PUCCH), where the UCI 154 can be repeated or be transmitted in a subset of slots.

In an aspect of method 1400, the UE 110 may execute the uplink control management component 150 to determine a timing advance offset 176 associated with each of the plurality of component carriers. For example, the determination for a component carrier is based on a numerology of the component carrier.

In an aspect of method 1400, the plurality of component carriers are configured with different numerologies, and the UE 110 may execute the uplink control management component 150 to utilize one of a primary cell or a primary secondary cell as a reference to determine the timing advance offset 176 for another component carrier.

Referring to FIG. 15, for example, a method 1500 of wireless communication in operating a base station 105 according to the above-described aspects for downlink control management using a slot format indicator in a new radio wireless communication system includes one or more of the herein-defined actions.

At block 1502, the method 1500 may generate, at a network entity, a slot format indicator for at least one component carrier of a plurality of component carriers, where the at least one component carrier includes a group common Physical Downlink Control Channel (PDCCH), the slot format indicator within the group common PDCCH indicating at least slot structure information for one or more other component carriers from the plurality of component carriers. For example, the base station 105 may execute the downlink control management component 170 to generate a slot format indicator 172 for at least one component carrier of a plurality of component carriers, where the at least one component carrier includes a group common PDCCH, the slot format indicator 172 within the group common PDCCH indicating at least slot structure information for one or more other component carriers from the plurality of component carriers.

At block 1504, the method 1500 may transmit, by the network entity, the slot format indicator in at least one slot of the at least one component carrier to a user equipment (UE). For example, the base station 105 may execute the downlink control management component 170 to transmit the slot format indicator 172 in at least one slot of the at least one component carrier to a UE 110.

At block 1506, the method 1500 may communicate, with the UE, using the at least slot structure information for the one more other component carriers. For example, the base station 105 may execute the downlink control management component 170 to communicate, with the UE 110, using the at least slot structure information for the one more other component carriers.

In an aspect of method 1500, a slot duration corresponds to the at least one component carrier is shorter than a slot duration corresponding to the one or more other component carriers.

In an aspect of method 1500, a slot duration corresponds to the at least one component carrier is longer than a slot duration corresponding to the one or more other component carriers.

In an aspect of method 1500, the base station 105 may execute the downlink control management component 170 to transmit a second PDCCH on a second component carrier from the plurality of component carriers, where the PDCCH conveys a slot format indicator 172 for at least one slot of the second component carrier.

In an aspect of method 1500, the slot format indicator 172 further indicates a slot structure information for the at least one component carrier carrying the slot format indicator 172.

In an aspect of method 1500, the base station 105 may execute the downlink control management component 170 to transmit a second slot format indicator 172 in at least a second slot of the at least one component carrier, the second slot format indicator 172 indicating a slot structure information for the at least one component carrier.

In an aspect of method 1500, the slot format indicator 172 further indicates a respective slot structure for multiple slots of the one or more other component carriers and the at least one component carrier.

In an aspect of method 1500, the at least one component carrier and the one or more other component carriers have different numerologies.

In an aspect of method 1500, the base station 105 may execute the downlink control management component 170 to transmit an indication to trigger CSI measurements 152 for the one or more other component carriers, the indication included within DCI 174 received in a slot of the at least one component carrier, and receive CSI measurements 152 for the one or more other component carriers, the CSI measurements 152 being determined by the UE 110 based on a measurement configuration.

In an aspect of method 1500, the base station 105 may execute the downlink control management component 170 to receive an UCI 154 in at least one slot of the at least one component carrier, the UCI 154 including uplink information for the one or more other component carriers.

In an aspect of method 1500, the UCI 154 corresponds to at least one of an acknowledgement signal, a negative acknowledgement signal, a scheduling request, a CQI, or a CSI.

In an aspect of method 1500, the base station 105 may execute the downlink control management component 170 to receive the UCI 154 in a PUCCH, where the UCI 154 can be repeated or be received in a subset of slots.

Figure 16:
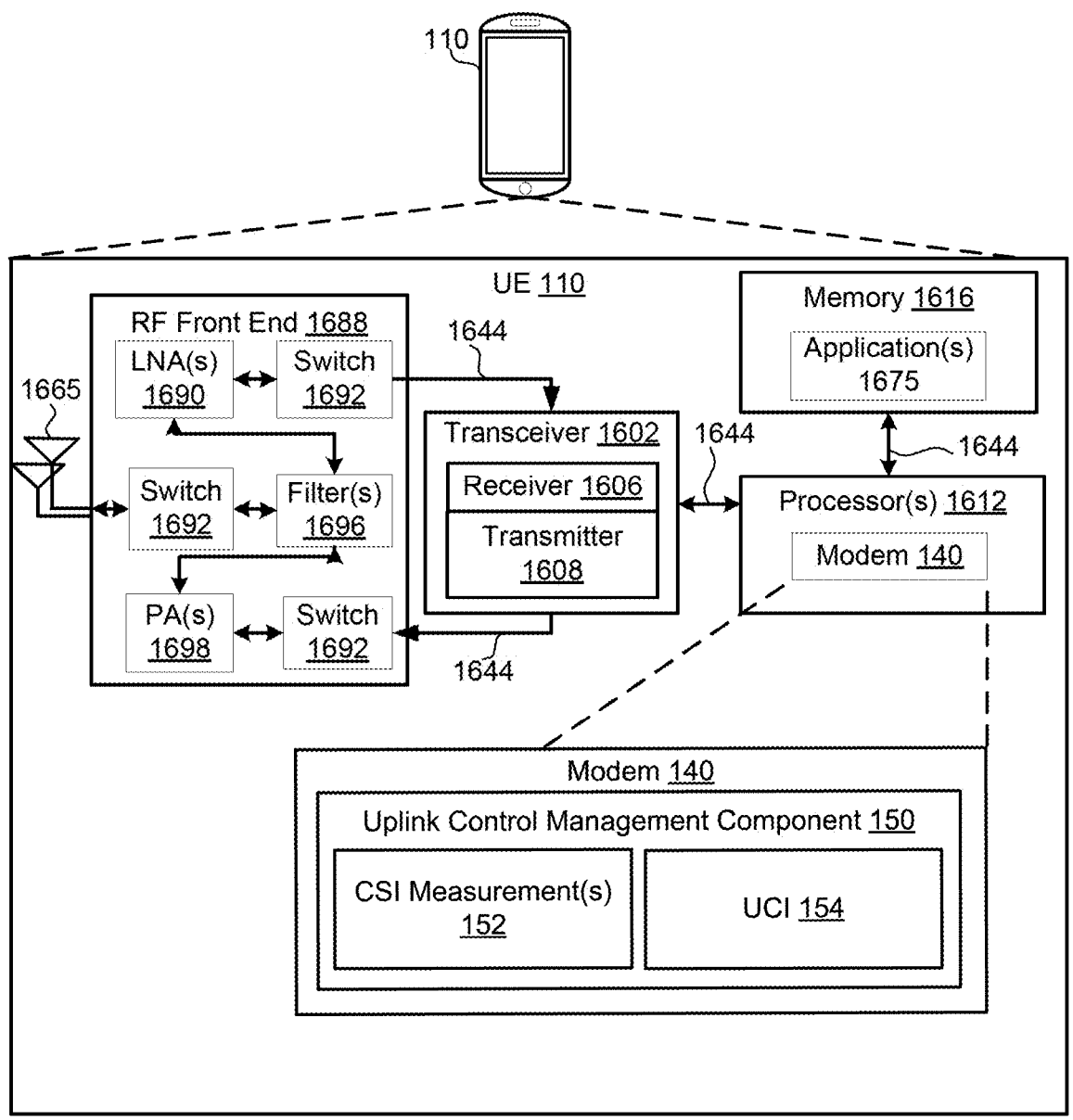
FIG. 16 is a schematic diagram of example components of the UE of FIG. 1.

Referring to FIG. 16, one example of an implementation of an UE 110 may include a variety of components, some of which have already been described above, but including components such as one or more processors 1612 and memory 1616 and transceiver 1602 in communication via one or more buses 1644, which may operate in conjunction with modem 140 and uplink control management component 150 to enable one or more of the functions described herein related to uplink control management of component carriers during carrier aggregation in a new radio wireless communication system. Further, the one or more processors 1612, modem 1614, memory 1616, transceiver 1602, radio frequency (RF) front end 1688 and one or more antennas 1665, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 1612 can include a modem 140 that uses one or more modem processors. The various functions related to uplink control management component 150 may be included in modem 140 and/or processors 1612 and, in an aspect, can be executed by a single processor, while in other aspects, different ones of the functions may be executed by a combination of two or more different processors. For example, in an aspect, the one or more processors 1612 may include any one or any combination of a modem processor, or a baseband processor, or a digital signal processor, or a transmit processor, or a receiver processor, or a transceiver processor associated with transceiver 1602. In other aspects, some of the features of the one or more processors 1612 and/or modem 140 associated with uplink control management component 150 may be performed by transceiver 1602.

Also, memory 1616 may be configured to store data used herein and/or local versions of applications 1675 or uplink control management component 150 and/or one or more of its subcomponents being executed by at least one processor 1612. Memory 1616 can include any type of computer-readable medium usable by a computer or at least one processor 1612, such as random access memory (RAM), read only memory (ROM), tapes, magnetic discs, optical discs, volatile memory, non-volatile memory, and any combination thereof. In an aspect, for example, memory 1616 may be a non-transitory computer-readable storage medium that stores one or more computer-executable codes defining uplink control management component 150 and/or one or more of its subcomponents, and/or data associated therewith, when UE 110 is operating at least one processor 1612 to execute uplink control management component 150 and/or one or more of its subcomponents.

Transceiver 1602 may include at least one receiver 1606 and at least one transmitter 1608. Receiver 1606 may include hardware, firmware, and/or software code executable by a processor for receiving data, the code comprising instructions and being stored in a memory (e.g., computer-readable medium). Receiver 1606 may be, for example, a RF receiver. In an aspect, receiver 1606 may receive signals transmitted by at least one base station 105. Additionally, receiver 1606 may process such received signals, and also may obtain measurements of the signals, such as, but not limited to, Ec/Io, SNR, RSRP, RSSI, etc. Transmitter 1608 may include hardware, firmware, and/or software code executable by a processor for transmitting data, the code comprising instructions and being stored in a memory (e.g., computer-readable medium). A suitable example of transmitter 1608 may include, but is not limited to, an RF transmitter.

Moreover, in an aspect, the UE 110 may include RF front end 1688, which may operate in communication with one or more antennas 1665 and transceiver 1602 for receiving and transmitting radio transmissions, for example, wireless communications transmitted by at least one base station 105 or wireless transmissions transmitted by the UE 110. RF front end 1688 may be connected to one or more antennas 1665 and can include one or more low-noise amplifiers (LNAs) 1690, one or more switches 1692, one or more power amplifiers (PAs) 1698, and one or more filters 1696 for transmitting and receiving RF signals.

In an aspect, LNA 1690 can amplify a received signal at a desired output level. In an aspect, each LNA 1690 may have a specified minimum and maximum gain values. In an aspect, RF front end 1688 may use one or more switches 1692 to select a particular LNA 1690 and its specified gain value based on a desired gain value for a particular application.

Further, for example, one or more PA(s) 1698 may be used by RF front end 1688 to amplify a signal for an RF output at a desired output power level. In an aspect, each PA 1698 may have specified minimum and maximum gain values. In an aspect, the RF front end 1688 may use one or more switches 1692 to select a particular PA 1698 and a corresponding specified gain value based on a desired gain value for a particular application.

Also, for example, one or more filters 1696 can be used by the RF front end 1688 to filter a received signal to obtain an input RF signal. Similarly, in an aspect, for example, a respective filter 1696 can be used to filter an output from a respective PA 1698 to produce an output signal for transmission. In an aspect, each filter 1696 can be connected to a specific LNA 1690 and/or PA 1698. In an aspect, RF front end 1688 can use one or more switches 1692 to select a transmit or receive path using a specified filter 1696, LNA 1690, and/or PA 1698, based on a configuration as specified by transceiver 1602 and/or processor 1612.

As such, transceiver 1602 may be configured to transmit and receive wireless signals through one or more antennas 1665 via RF front end 1688. In an aspect, transceiver may be tuned to operate at specified frequencies such that the UE 110 can communicate with, for example, one or more base stations 105 or one or more cells associated with one or more base stations 105. In an aspect, for example, modem 140 can configure transceiver 1602 to operate at a specified frequency and power level based on the UE configuration of the UE 110 and the communication protocol used by modem 140.

In an aspect, modem 140 can be a multiband-multimode modem, which can process digital data and communicate with transceiver 1602 such that the digital data is sent and received using transceiver 1602. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1688, transceiver 1602) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 17:
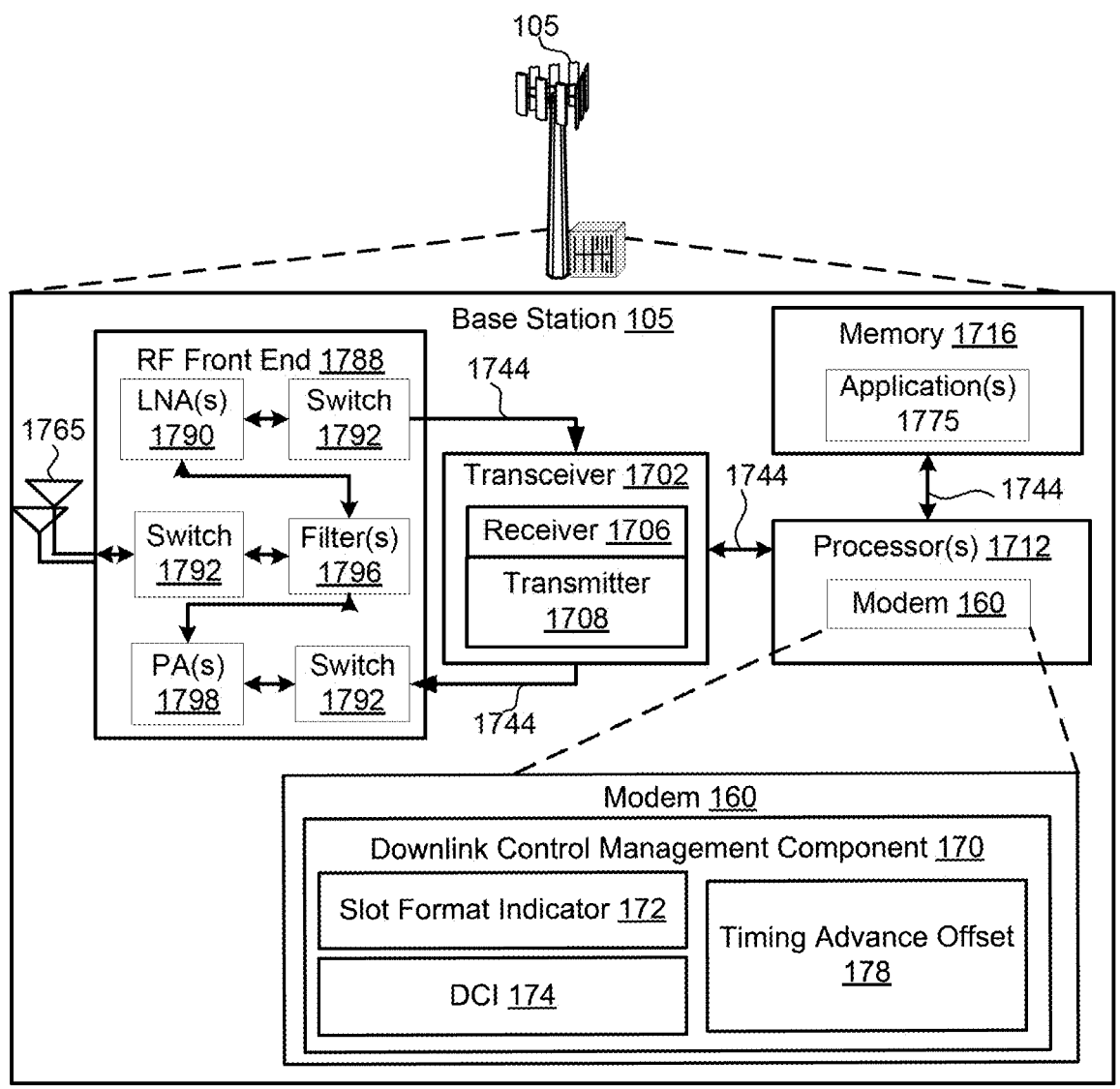
FIG. 17 is a schematic diagram of example components of the base station of FIG. 1.

Referring to FIG. 17, one example of an implementation of base station 105 may include a variety of components, some of which have already been described above, but including components such as one or more processors 1712, a memory 1716, and a transceiver 1702 in communication via one or more buses 1744, which may operate in conjunction with modem 160 and downlink control management component 170 to enable one or more of the functions described herein relating to downlink control management of component carriers during carrier aggregation in a new radio environment.

The transceiver 1702, receiver 1706, transmitter 1708, one or more processors 1712, memory 1716, applications 1775, buses 1744, RF front end 1788, LNAs 1790, switches 1792, filters 1796, PAs 1798, and one or more antennas 1765 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
    receiving, at a user equipment (UE), a slot format indicator in at least one slot of at least one component carrier of a plurality of component carriers from a network entity, where the at least one component carrier includes a group common Physical Downlink Control Channel (PDCCH), the slot format indicator conveyed by the group common PDCCH indicating slot structure information for one or more other component carriers from the plurality of component carriers, wherein the at least one component carrier provides uplink feedback for the one or more other component carriers scheduled based on an association between the slot format indicator and a corresponding Downlink Control Information (DCI) format that configures hybrid automatic repeat request (HARQ) acknowledgment reporting for cross-carrier scheduling; and
    communicating, with the network entity, using the slot structure information for the one or more other component carriers.

2. The method of claim 1, wherein a slot duration corresponding to the at least one component carrier is shorter than a slot duration corresponding to the one or more other component carriers.

3. The method of claim 1, wherein a slot duration corresponding to the at least one component carrier is longer than a slot duration corresponding to the one or more other component carriers.

4. The method of claim 1, further compromising receiving a second PDCCH on a second component carrier from the plurality of component carriers, where the PDCCH conveys a slot format indicator for at least one slot of the second component carrier.

5. The method of claim 1, wherein the slot format indicator further indicates a slot structure information for the at least one component carrier carrying the slot format indicator.

6. The method of claim 1, further comprising receiving, at the UE, a second slot format indicator in at least a second slot of the at least one component carrier, the second slot format indicator indicating a slot structure information for the at least one component carrier.

7. The method of claim 1, wherein the slot format indicator further indicates a respective slot structure for multiple slots of the one or more other component carriers and the at least one component carrier.

8. The method of claim 1, wherein the at least one component carrier and the one or more other component carriers have different numerologies.

9. The method of claim 1, further comprising:
    receiving, at the UE, an indication to trigger Channel State Information (CSI) measurements for the one or more other component carriers, the indication included within DCI received in a slot of the at least one component carrier;
    determining a measurement configuration for performing the CSI measurements in the one or more other component carriers;
    performing the CSI measurements in the one or more other component carriers based on the measurement configuration;
    transmitting, to the network entity, the CSI measurements for the one or more other component carriers.

10. The method of claim 1, further comprising:
    generating, at the UE, Uplink Control Information (UCI) in the at least one component carrier, the UCI including uplink information for the one or more other component carriers; and
    transmitting, to a network entity, the UCI in at least one slot of the at least one component carrier.

11. The method of claim 10, wherein the UCI corresponds to at least one of an acknowledgement signal, a negative acknowledgement signal, a scheduling request, a Channel Quality Indicator (CQI), or a Channel State Information (CSI).

12. The method of claim 1, wherein transmitting the UCI further comprises transmitting the UCI in a Physical Uplink Control Channel (PUCCH), where the UCI can be repeated or be transmitted in a subset of slots.

13. The method of claim 1, further comprising:
    determining, at the UE, a timing advance offset associated with each of the plurality of component carriers.

14. The method of claim 13, wherein the determination for a component carrier is based on a numerology of the component carrier.

15. The method of claim 13, wherein the plurality of component carriers are configured with different numerologies; and further comprising:
    utilizing one of a primary cell or a primary secondary cell as a reference to determine the timing advance offset for another component carrier.

16. An apparatus, comprising:
    a memory; and
    a processor in communication with the memory, wherein the processor is configured to:
        receive, at a user equipment (UE), a slot format indicator in at least one slot of at least one component carrier of a plurality of component carriers from a network entity, where the at least one component carrier includes a group common Physical Downlink Control Channel (PDCCH), the slot format indicator conveyed by the group common PDCCH indicating slot structure information for one or more other component carriers from the plurality of component carriers, wherein the at least one component carrier provides uplink feedback for the one or more other component carriers scheduled based on an association between the slot format indicator and a corresponding Downlink Control Information (DCI) format that configures hybrid automatic repeat request (HARQ) acknowledgment reporting for cross-carrier scheduling; and communicate, with the network entity, using the slot structure information for the one or more other component carriers.

17. A method of wireless communication, comprising:
generating, at a network entity, a slot format indicator for at least one component carrier of a plurality of component carriers, where the at least one component carrier includes a group common Physical Downlink Control Channel (PDCCH), the slot format indicator conveyed by the group common PDCCH indicating slot structure information for one or more other component carriers from the plurality of component carriers, wherein the at least one component carrier provides uplink feedback for the one or more other component carriers scheduled based on an association between the slot format indicator and a corresponding Downlink Control Information (DCI) format that configures hybrid automatic repeat request (HARQ) acknowledgment reporting for cross-carrier scheduling;

transmitting, by the network entity, the slot format indicator in at least one slot of the at least one component carrier to a user equipment (UE); and communicating, with the UE, using the slot structure information for the one or more other component carriers.

18. The method of claim 17, wherein a slot duration corresponding to the at least one component carrier is shorter than a slot duration corresponding to the one or more other component carriers.

19. The method of claim 17, wherein a slot duration corresponding to the at least one component carrier is longer than a slot duration corresponding to the one or more other component carriers.

20. The method of claim 17, further compromising transmitting a second PDCCH on a second component carrier from the plurality of component carriers, where the PDCCH conveys a slot format indicator for at least one slot of the second component carrier.

* * * * *